United States Patent [19]

Kobayashi et al.

[11] Patent Number: 5,563,864

[45] Date of Patent: Oct. 8, 1996

[54] INFORMATION RECORDING AND REPRODUCING APPARATUS

[75] Inventors: Michio Kobayashi; Satoshi Nebashi; Tatsuya Shimoda, all of Suwa; Hisashi Osawa; Yoshihiro Okamoto, both of Matsuyama, all of Japan

[73] Assignee: Seiko Epson Corporation, Tokyo, Japan

[21] Appl. No.: 540,821

[22] Filed: Oct. 11, 1995

Related U.S. Application Data

[63] Continuation-in-part of Ser. No. 309,286, Sep. 20, 1994, Pat. No. 5,488,591.

[30] Foreign Application Priority Data

Dec. 24, 1993 [JP] Japan ................................. 5-328592
Oct. 14, 1994 [JP] Japan ................................. 6-249870
Jul. 20, 1995 [JP] Japan ................................. 7-183149

[51] Int. Cl.$^6$ ........................... G11B 5/09; G11B 11/00
[52] U.S. Cl. ........................... 369/59; 369/48; 369/13
[58] Field of Search ........................... 369/59, 47, 48, 369/49, 32, 44.25, 124, 13; 360/40, 41, 46, 114, 51, 59

[56] References Cited

U.S. PATENT DOCUMENTS

| | | | |
|---|---|---|---|
| 5,070,492 | 12/1991 | Ogawa et al. | 369/47 |
| 5,189,650 | 2/1993 | Watanabe et al. | 369/13 |
| 5,311,493 | 5/1994 | Fuji | 369/59 |
| 5,363,352 | 11/1994 | Tobita et al. | 369/13 |
| 5,420,893 | 5/1995 | Ward | 369/13 X |
| 5,488,591 | 1/1996 | Kobayashi et al. | 369/13 |

FOREIGN PATENT DOCUMENTS 4-221464 8/1992 Japan.
5-2842 1/1993 Japan.

*Primary Examiner*—Ali Neyzari
*Attorney, Agent, or Firm*—Harold T. Tsiang

[57] ABSTRACT

A magneto-optical recording and reproducing apparatus achieving an improvement in high density recording and bit error correction rate. The magneto-optical recording and reproducing apparatus comprises coding and modulating means for (1,7) RLL encoding and then NRZI encoding a digital information series $\{A_i\}$; recording and reproducing means for recording the encoded series $\{a_i\}$ to a magneto-optical recording medium, and reproducing an analog signal from the medium as elementary waveform sequence $e(t)$ using an optical head; a transversal filter type waveform equalizer for waveform equalizing elementary waveform sequence $e(t)$ by applying the transfer function $(1+2D+2D^2+D^3)$ of the PR(1,2,2,1) encoding method to the elementary waveform of the encoded sequences, where delay operators D have a delay time of the encoded sequence cell width $T_b$; a low pass filter; an A/D converter for sampling and quantizing the equalized waveform sequence $x(t)$; and a Viterbi decoder for comparing the A/D converter output $\{a_i\}$ with a particular expected value, and determining the most probable path as decoded sequence $\{A_i\}$. The transfer function of PR(1,2,2,1) encoding well approximates the combined transfer function of the recording and reproducing means and the waveform equalizer, achieves strong suppression of interwaveform interference, and achieves high density recording. The Viterbi decoder has a long minimum free distance and an improved error correction rate.

23 Claims, 10 Drawing Sheets

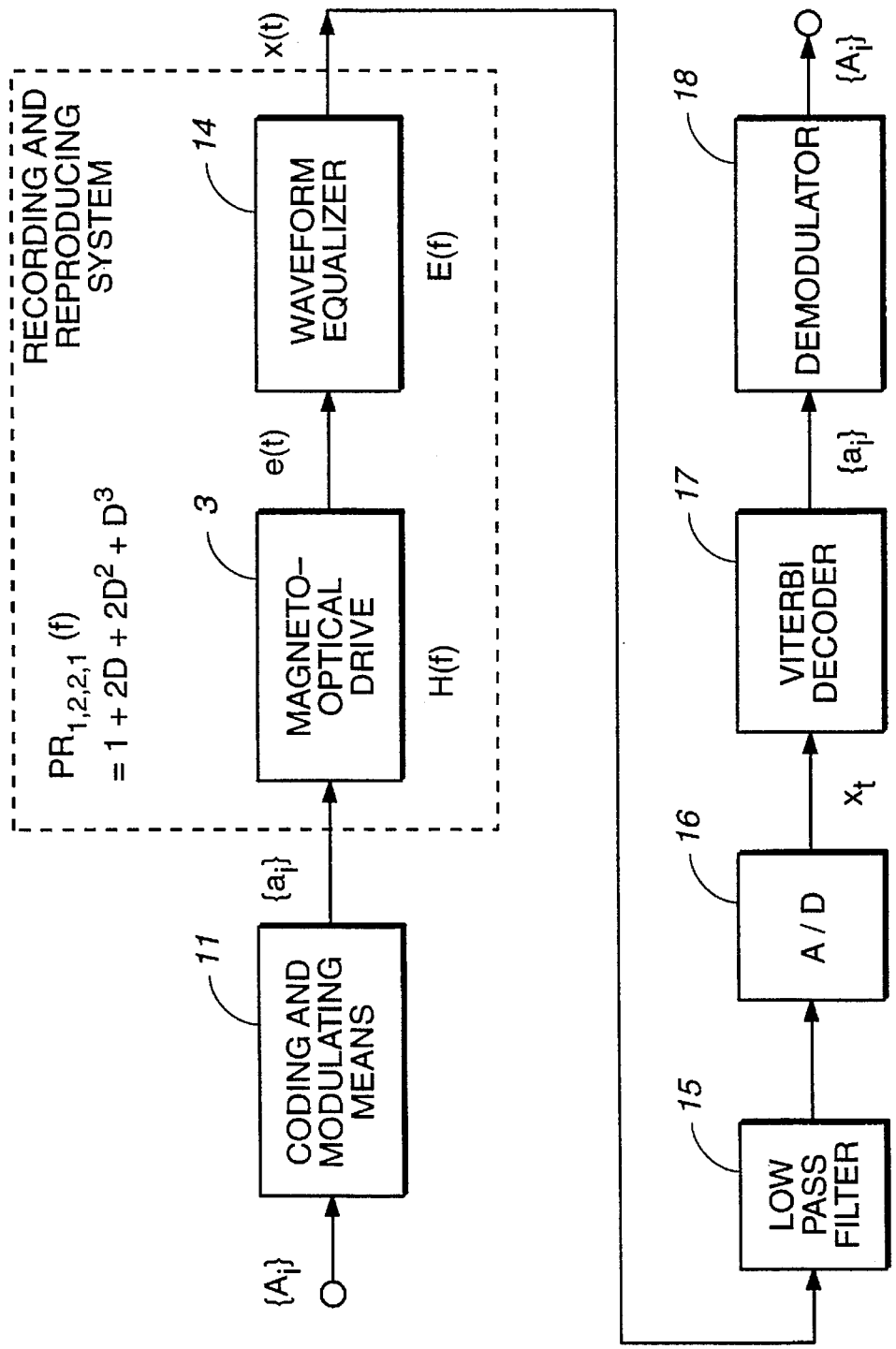
FIG._1

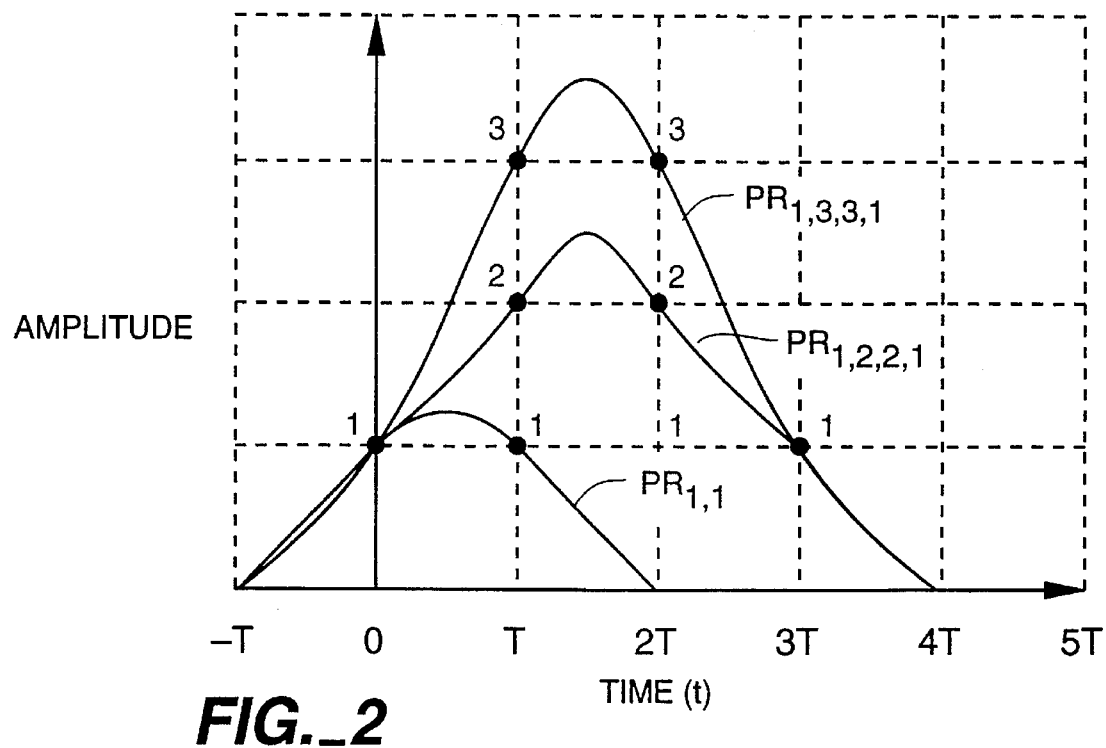
FIG._2
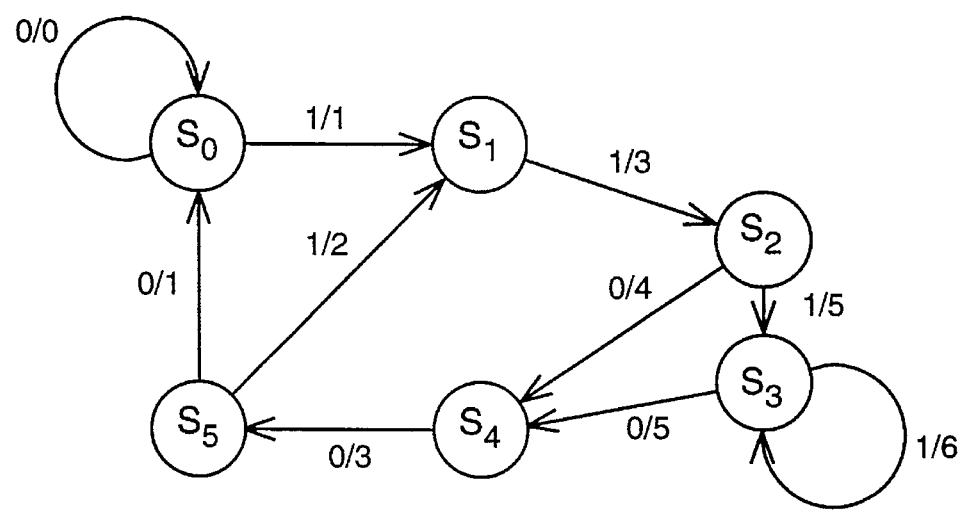
FIG._3

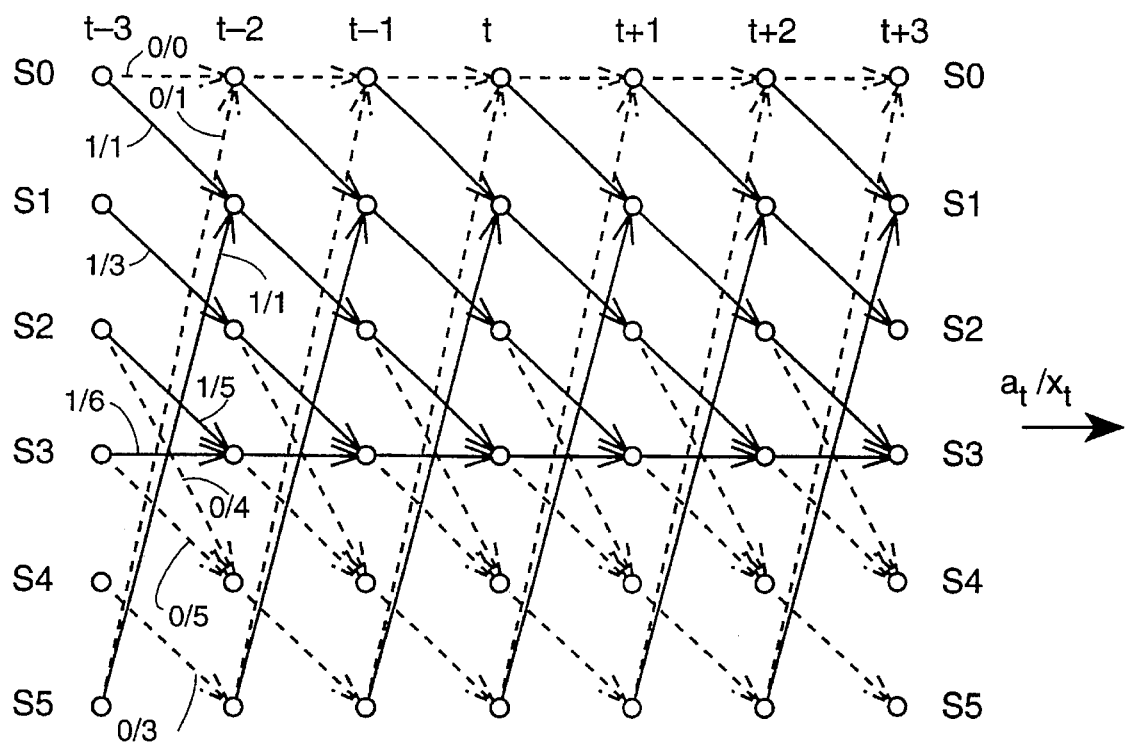
FIG._4
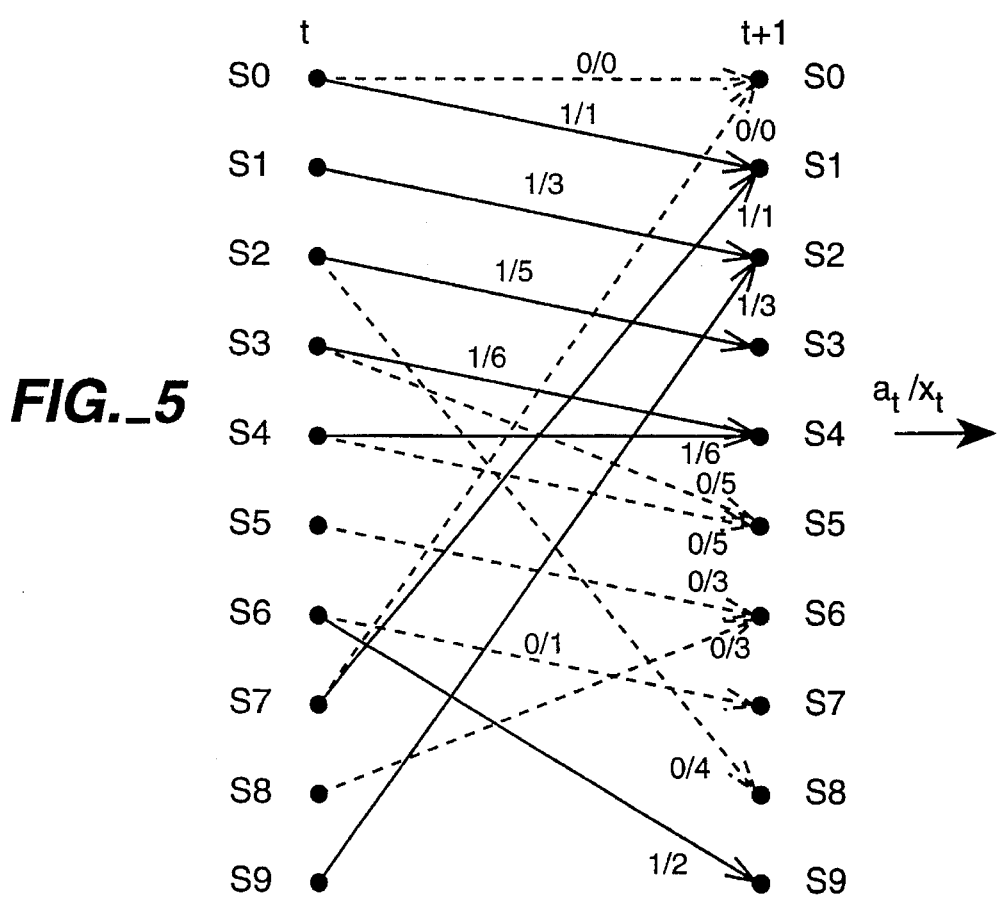
FIG._5

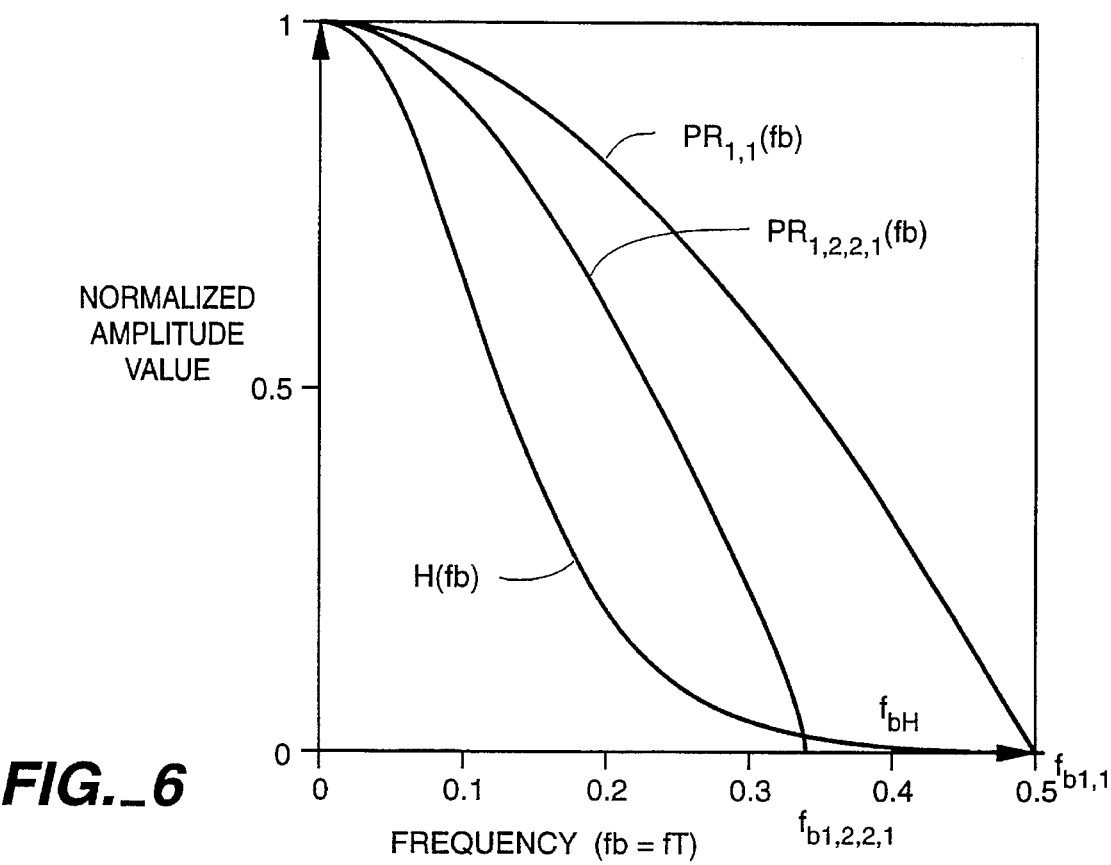
FIG._6
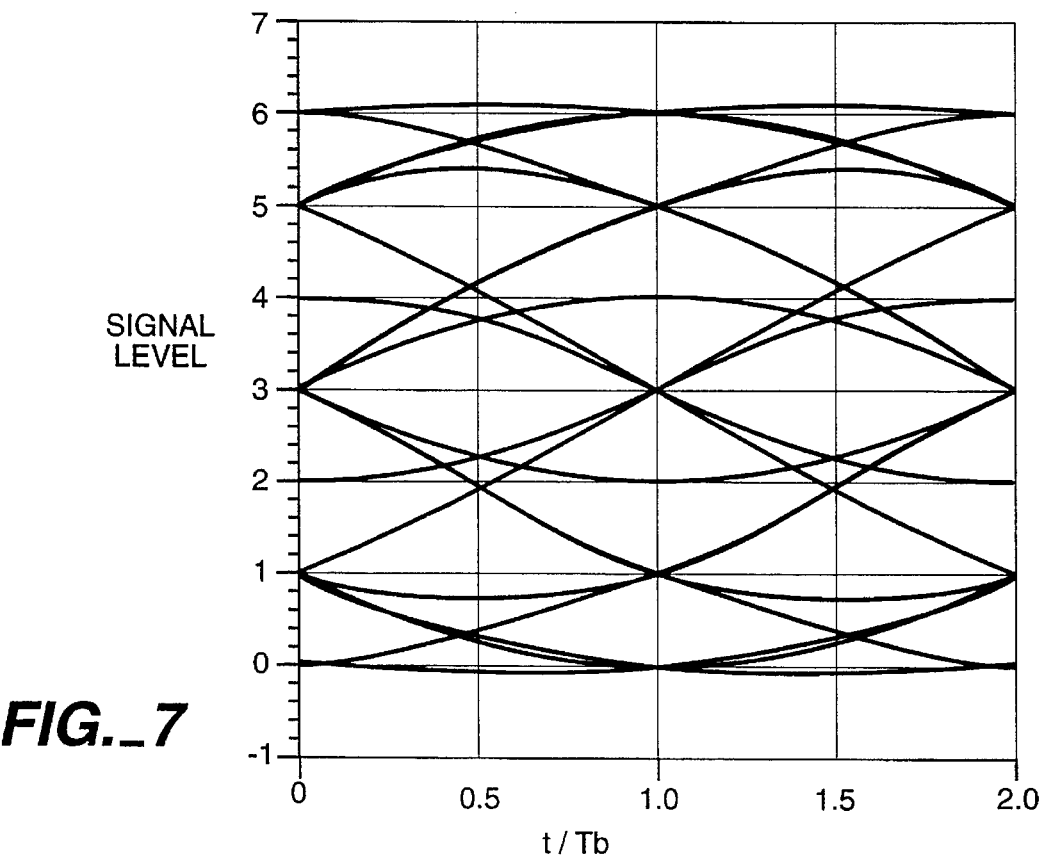
FIG._7

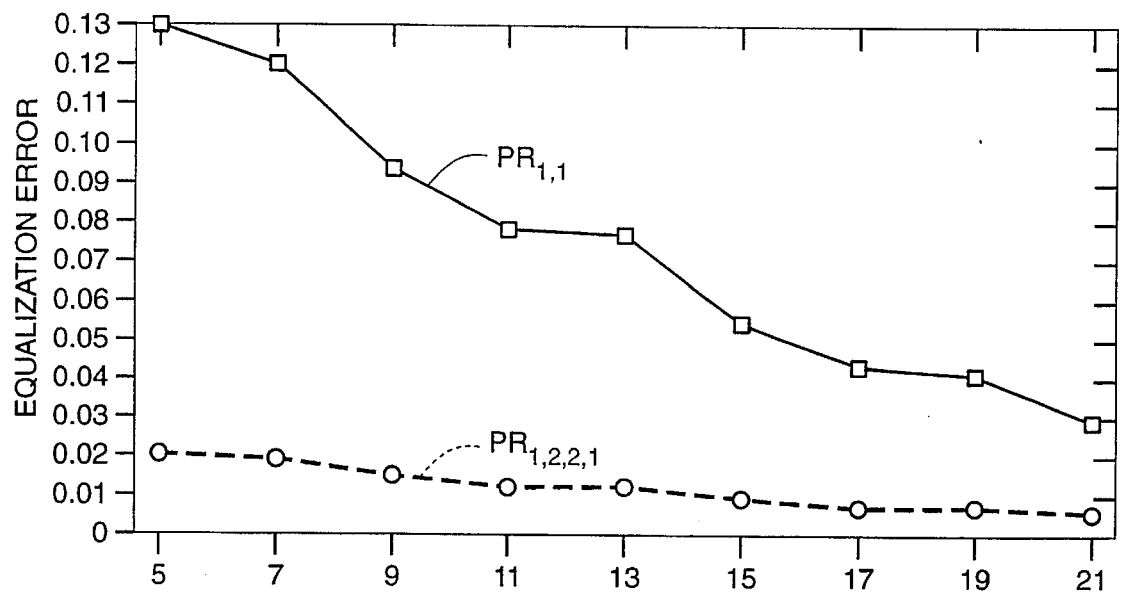
FIG._8
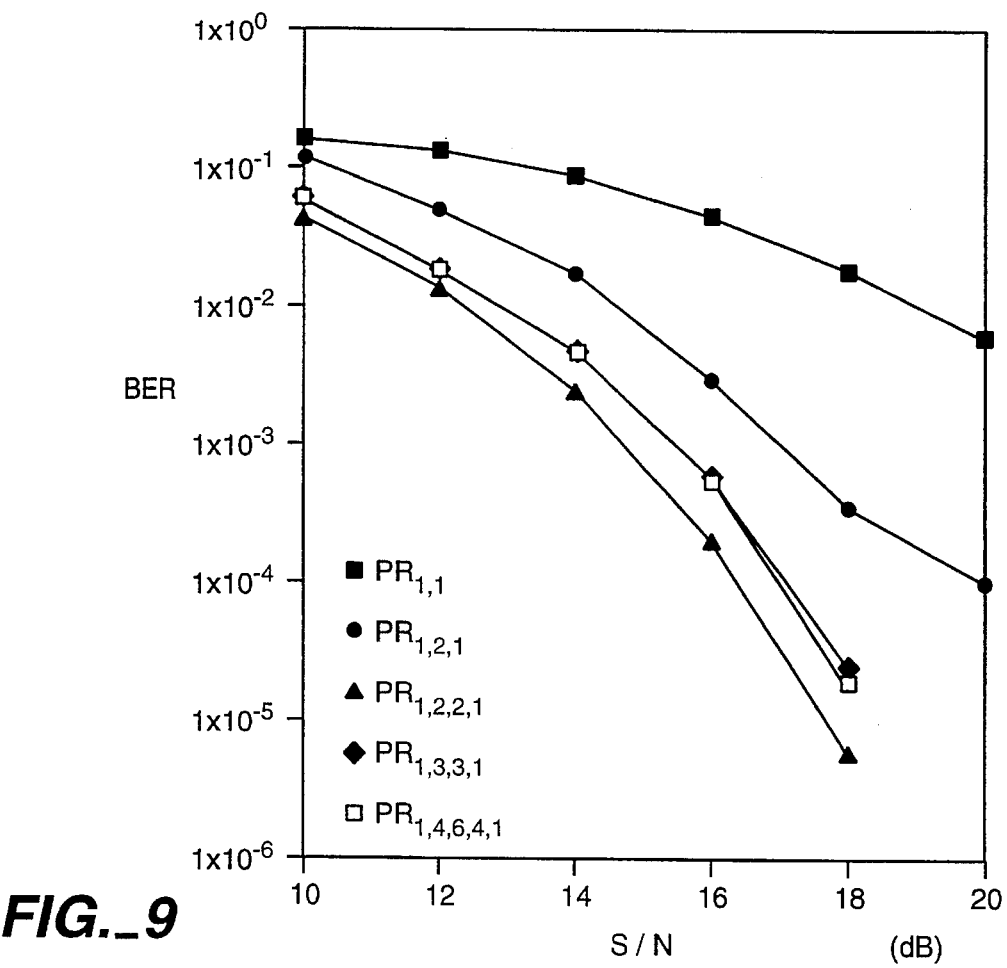
FIG._9

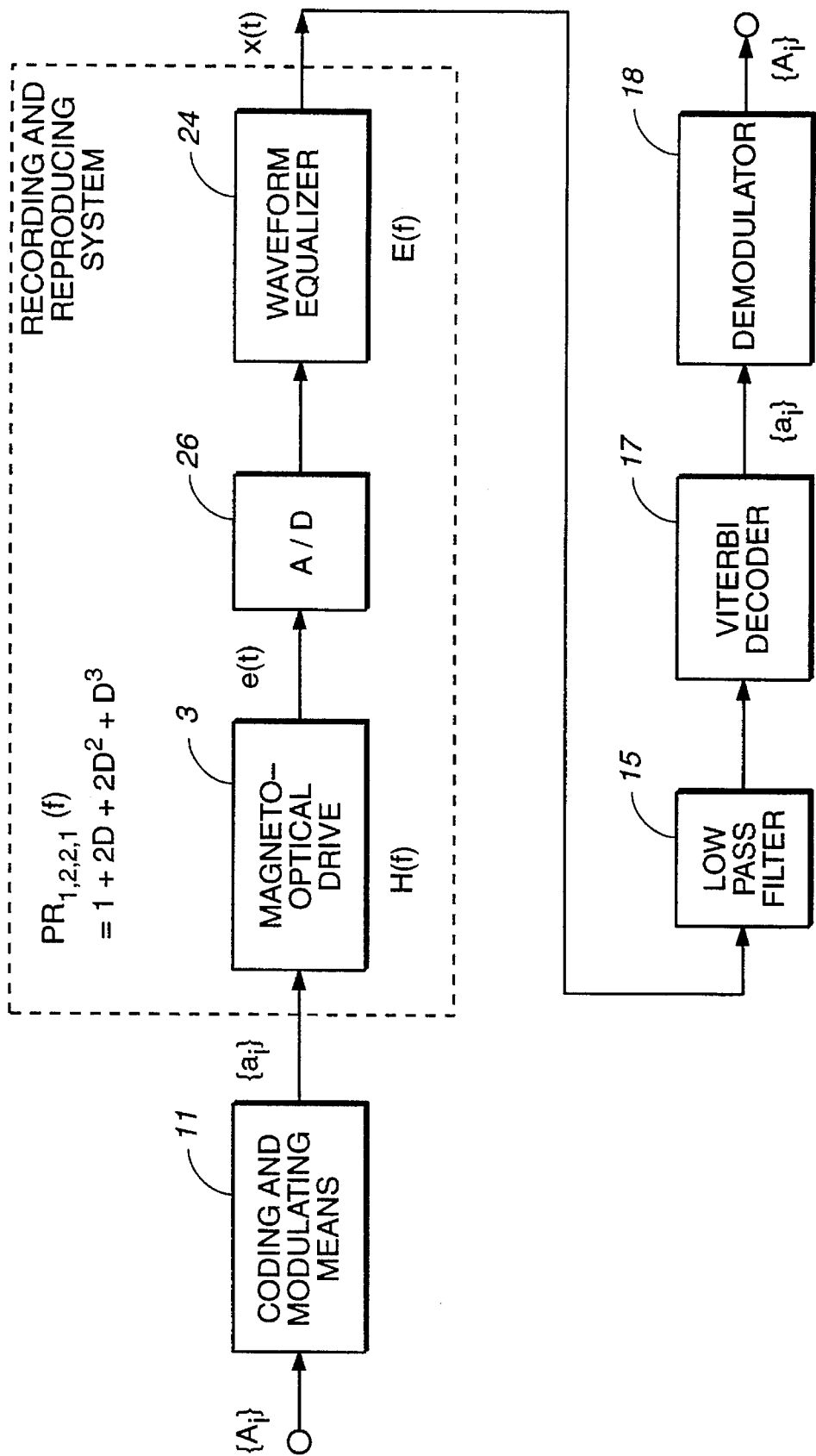
FIG._10

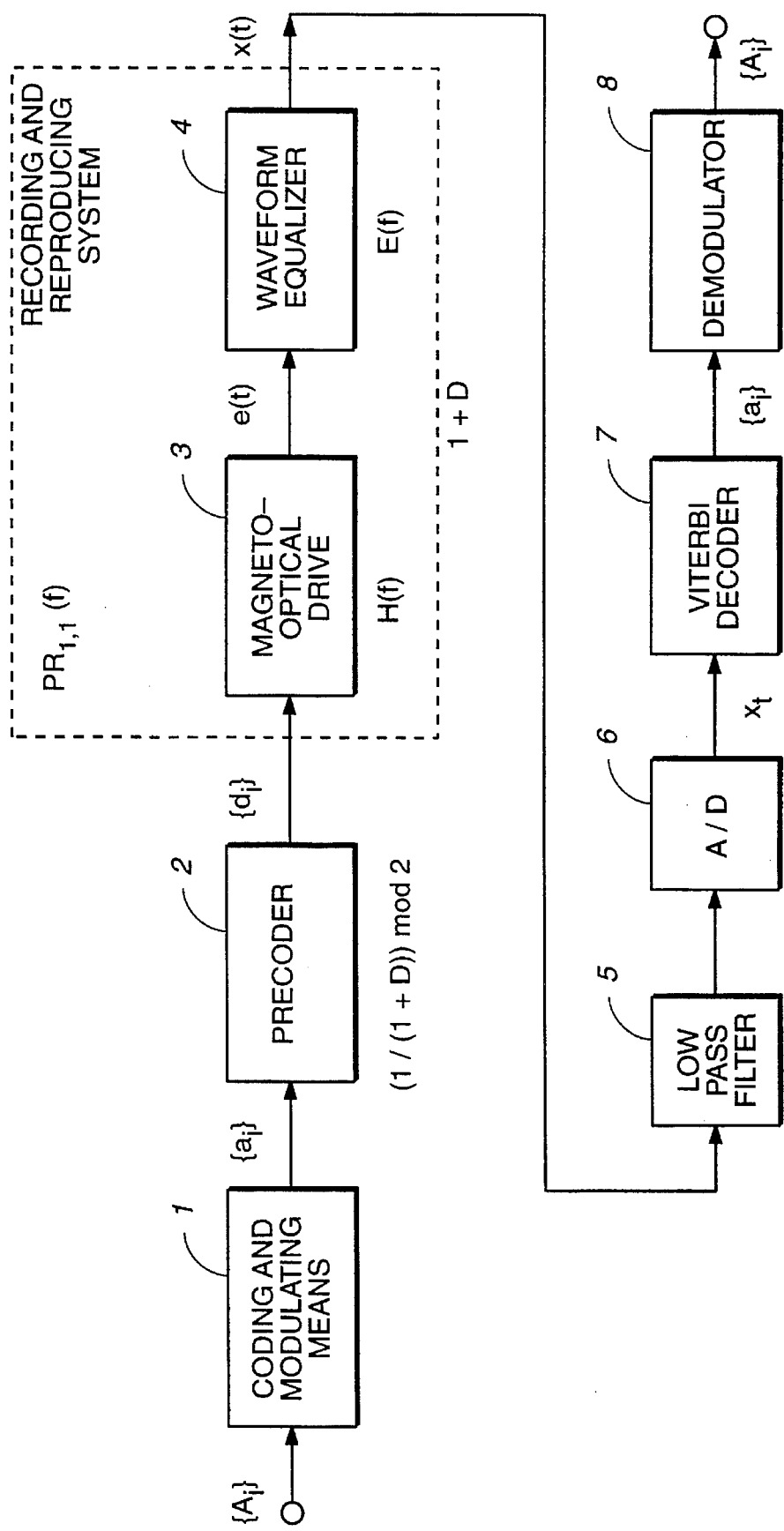
FIG._11 (PRIOR ART)

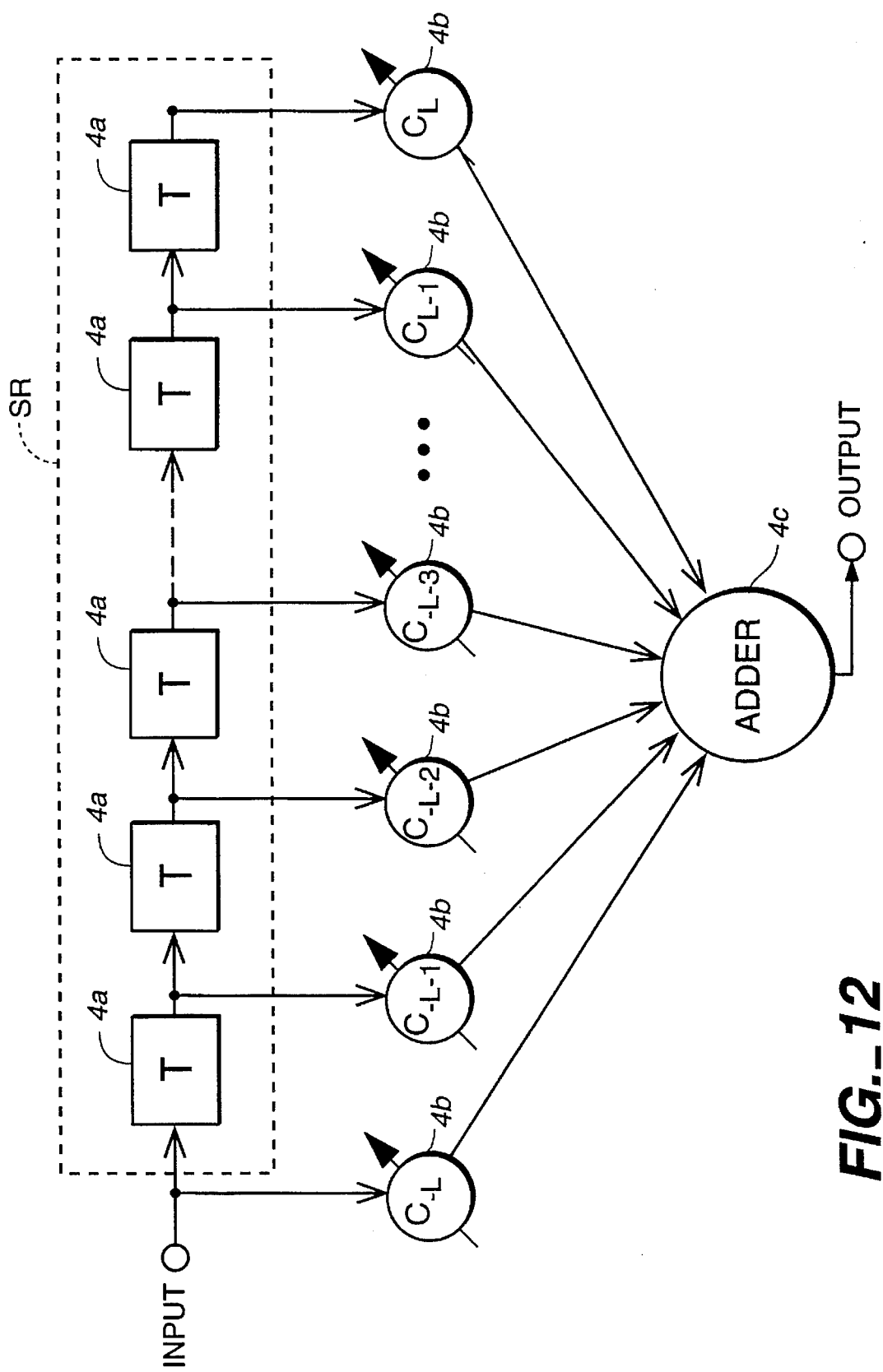
FIG._12

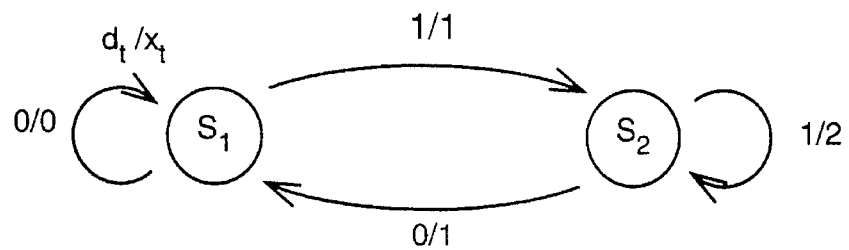
FIG._13
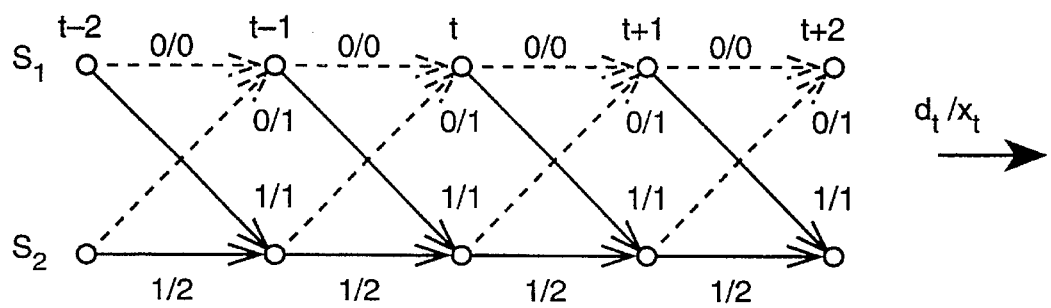
FIG._14
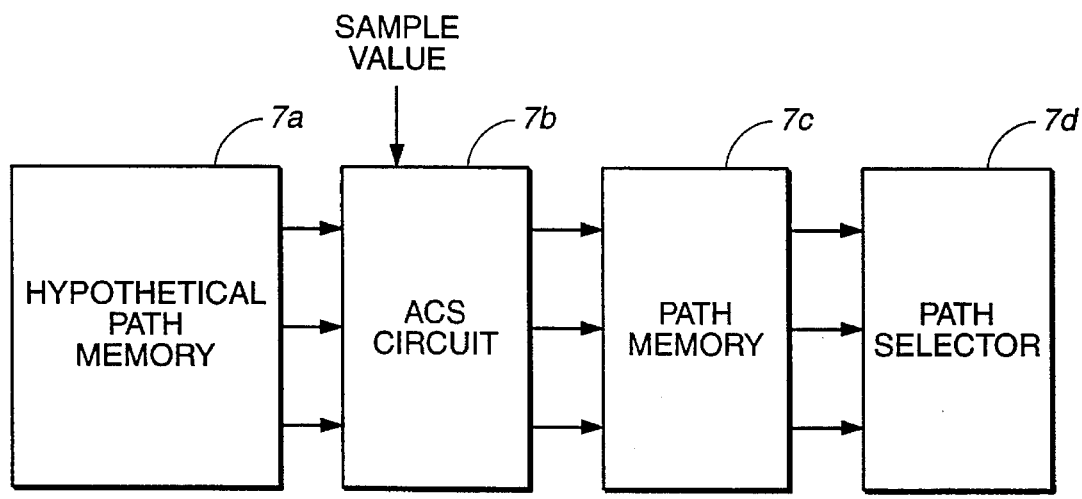
FIG._15

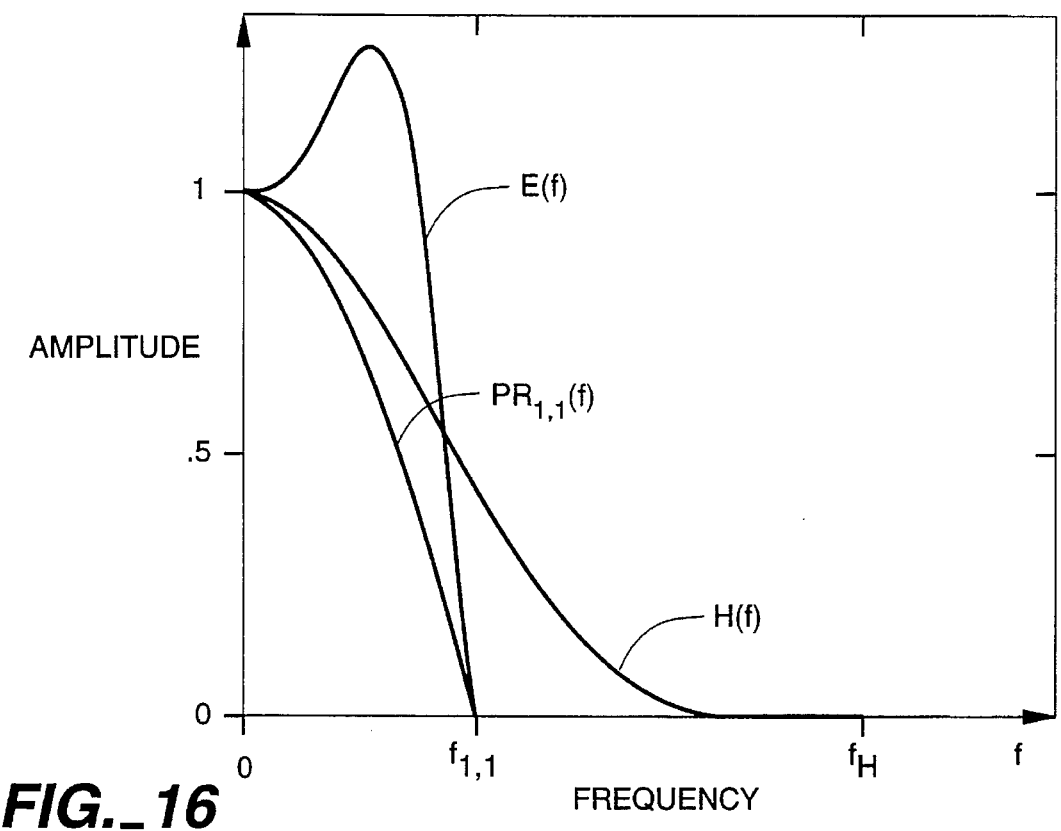
FIG._16
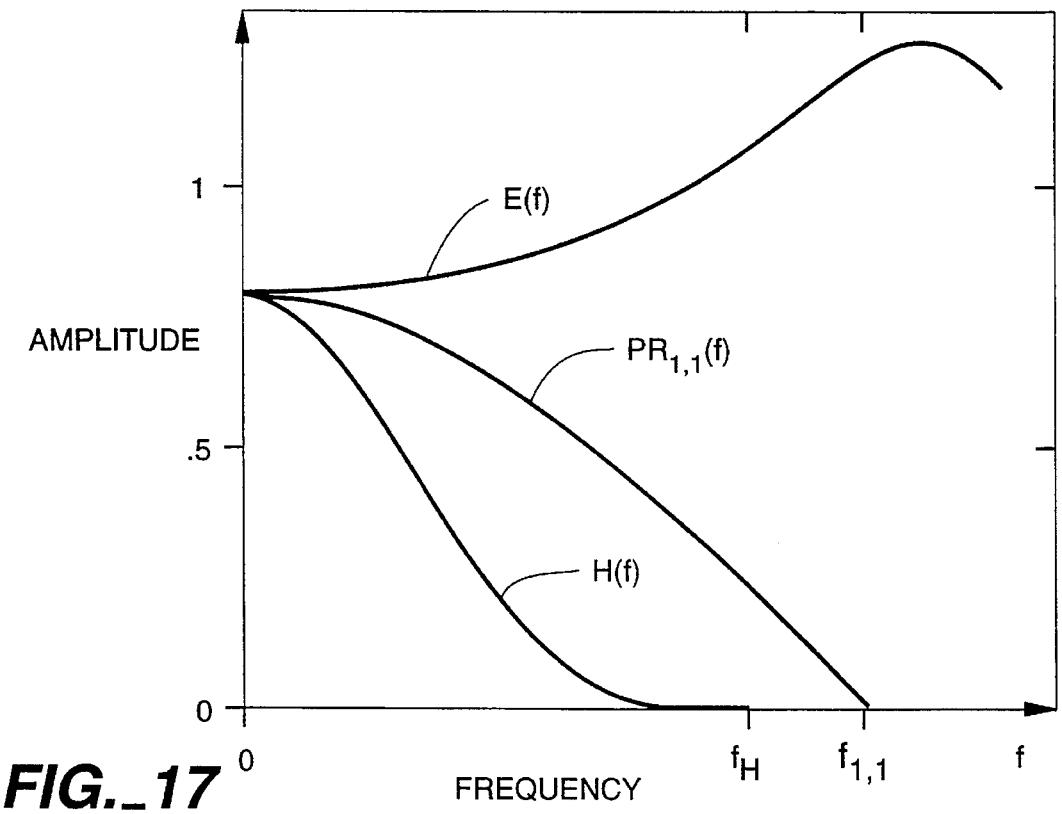
FIG._17

INFORMATION RECORDING AND REPRODUCING APPARATUS

This is a Continuation-In-Part of application Ser. No. 08/309,286, filed Sep. 20, 1994 now U.S. Pat No. 5,488,591.

BACKGROUND OF THE INVENTION

1. Field of the Invention

The present invention relates to an information recording and reproducing apparatus such as a magneto-optical recording and reproducing apparatus or an optical recording and reproducing apparatus for reproducing information by means of an optical head, and relates particularly to a partial response method suited for use in combination with a Viterbi decoder for high density recording with an improved error correction rate.

2. Description of the Related Art

Partial response techniques have been proposed to replace peak detection (level detection) type signal detection methods as a means of improving the high density recording capacity of the recording and reproducing signal processing technologies in digital magnetic recording. These partial response techniques have been described, for example, in Japanese TOKKAI H4-221464 (1992-221464) and H5-2842 (1993-2842). It is also known that applying Viterbi decoding techniques to the demodulation system as a maximum likelihood decoding method (error correction decoding) is an effective means of improving the error rate characteristic. Partial response and Viterbi decoding have also been applied in the related field of optical recording and magneto-optical recording as described by Ozawa, Yamauchi, and Tazaki in "Applications of Viterbi decoding using a new variable length block coding and d constraint for magneto-optical recording" (pp. 1369–1375, *Television Magazine* (in Japanese), 44, 10 (1990)).

FIG. 11 is a block diagram of a conventional magneto-optical recording and reproducing system using partial response and Viterbi decoding.

To suppress interference (intersymbol interference) of the elementary waveform (readback waveform) as a result of the bandwidth limit of magneto-optical drive 3, and to facilitate extraction of the synchronization data from the elementary waveform sequence in this magneto-optical recording and reproducing system, a specific coding modulator 1 is provided for coding according to coding rules matching the characteristics of magneto-optical drive 3. This coding modulator 1 comprises a (2,7) RLL coder for RLL-coding (run-length-limited coding) the input data bit sequence {$A_i$} (a digital information sequence) to be recorded using the minimum run constraint d=2 and maximum run constraint k=7; and an NRZI modulator for converting the (2,7) RLL code sequence to an NRZI (non-return-to-zero inversion) code (at symbol 0, level inversion is not applied; only at symbol 1 is level inversion applied at the leading edge of the cell). Constraint k (=7) of the (2,7) RLL code rule offers the advantage of being able to suppress intersymbol interference. In addition, the mark length modulation by an NRZI modulator helps to improve the recording density.

Furthermore, with the magneto-optical recording and reproducing system shown in FIG. 11, the coded data sequence {$a_i$} generated by coding modulator 1 is first input to a precoder 2 at a certain position. Precoder 2 has a transfer characteristic that is the inverse of that of the waveform equalizer 4 described below, specifically a [1/(1+D)]mod2 characteristic. Precoding by precoder 2 cancels the recording and reproducing characteristics in the output of the waveform equalizer 4 to prevent error propagation by Viterbi decoder 7 on the output side.

The recording code sequence {$d_i$} from precoder 2 is then recorded to the magnetic thin-film of the magneto-optical recording medium as the elementary waveform sequence to be recorded using the thermal effect of the semiconductor laser of magneto-optical drive 3.

During the reproduction process, the recorded symbol sequence is read from the magneto-optical recording medium by the optical head of magneto-optical drive 3, and amplified by a preamplifier to obtain readback elementary waveform sequence e(t).

Waveform equalization is then applied to the elementary waveform sequence e(t) by the waveform equalizer 4 to correct the waveform and compensate for waveform interference as a means of achieving high density recording. A transversal filter is generally used for this waveform equalizer 4. As shown in FIG. 12, this filter comprises a serial delay stage (SR) of (2L) serially-connected delay circuits 4a having a delay time T; (2L+1) weighting circuits (multipliers) 4b for multiplying the output from each tap (signal discrimination point) by a weighting coefficient $c_j$ (where j=–L, ..., –1, 0,+1, ... ,+L); and an adder 4c for obtaining the total sum of the weighted products. Note that it is not necessary for the delay time T of the delay circuits 4a to be equal to the cell width $T_b$ of the NRZI encoded sequence, and delay circuits 4a of delay time T=$T_b$/m (where m is a natural number), for example, may be used to reduce waveform equalization error.

When the readback elementary waveform stream e(t) is sampled at the optimum sampling instant k$T_b$, the sampled values are dependent only on the elementary waveform corresponding to the coded symbol. To eliminate interwaveform interference and prevent interference from adjacent elementary waveforms, the first Nyquist condition for zero intersymbol interference (shown below) must be satisfied.

$$e_k = e(kT_b) = e_0 \delta_{k0} \qquad [1]$$

where $T_b$ is the cell width (the time uñit of the NRZI encoded sequence); and $\delta_{k0}$ is the Kronecker delta where $\delta_{ij}$=1 (when i=j), and $\delta_{ij}$=0 (when i≠j) A rectangular pulse wave, Nyquist waveform, and other waves are elementary waveforms $e_0$ known to satisfy this Nyquist condition, but the most basic waveform known to satisfy the Nyquist condition is the Nyquist waveform (sampling function) r(t) shown below.

$$r(t/T_b - n) = \text{sinc}\ (t/T_b - n) = \sin\ (t/T_b - n)/(t/T_b - n) \qquad [2]$$

However, because resolution deteriorates in high density recording and differences in precision occur between different devices even when the Nyquist waveform r(t) is used as the elementary waveform, interwaveform interference unavoidably continues to occur and induces intersymbol interference. Thus, waveform equalizer 4 actually actively uses interwaveform interference. In other words, if h(t) is the output waveform (impulse response waveform) of waveform equalizer 4 to the combined transfer functions of precoder 2, magneto-optical drive 3, and waveform equalizer 4 when an impulse is applied to the input of precoder 2, the output x(t) of waveform equalizer 4 to an encoded data sequence {$a_i$} input to precoder 2 is obtained by equation [3].

$$x(t) = \sum_k a_k h\left(\frac{t}{T_b} - k\right) \qquad [3]$$

where $a_k$ is the data input at time k, and $T=T_b$.

If waveform equalizer 4 is a transversal filter having delay circuits 4a of delay time T as shown in FIG. 12, h(t) is expressed by a convolution of Nyquist waveform r(t).

$$h(t) = \sum_{n=0}^{L} C_n \gamma\left(\frac{t}{T_b} - n\right) \qquad [4]$$

where the Nyquist waveform is equivalent to the response component of the delay operation when $n \ne 0$, and is known as the partial response. From equations [3] and [4], $$\begin{aligned} x(t) &= \sum_k a_k \left[ \sum_{n=0}^{L} C_n \gamma\left(\frac{t}{T_b} - n - k\right) \right] \\ &= \sum_k a'_k \gamma\left(\frac{t}{T_b} - k\right) \end{aligned} \qquad [5]$$

where $$a'_k = \sum_{n=0}^{L} C_n a_{k-n} \qquad [6]$$

and, can be detected as $$x(t=kT_b) = a'_n |_{\mod N} \qquad [7]$$

from equation [1].

In other words, output x(t) of waveform equalizer 4 is discriminated at a discrete-time discrimination point ($kT_b$) as a multivalued signal level of (mod N). In general, the weighting coefficients $c_j$ are set at an appropriate integral ratio. A waveform equalizer 4 of which the weighting coefficients $c_j$ are an integral ratio is known as a partial response (PR) circuit. In the partial response method, the output of the PR circuit is generally expressed as PR($c_o, c_1, \ldots, c_L$) using the weighting coefficients $c_j$ of the PR circuit. Note that the weighting coefficients $c_j$ may be expanded to include real numbers as necessary. Note, also, that Kretzmer, the developer of the PR method, shows five forms for the PR method: PR(1,1), PR(1,2,1), PR(2,1,−1), PR(1,0,−1), and PR(−1,0,2,−1).

The optical transfer function OTF of magneto-optical recordings suggests a sinc function in the magneto-optical recording and reproducing system shown in FIG. 11, which therefore uses the PR(1,1) method having similar frequency characteristics.

Because $c_o = c_1 = 1$ in the PR(1,1) method, the output waveform (impulse response) h(t) of waveform equalizer 4 is a composite waveform of $r(t/T_b)$ and the delay waveform $r(t/T_b-1)$. The amplitude value thus changes $0 \to 1 \to 1 \to 0$ because the discrimination point is every $T_b$, and the impulse input can therefore be detected by discriminating the amplitude value. When delay operator D is used in the PR(1,1) method, digital transfer function G(D) can be expressed as G(D)=1+D. Thus, an input of $d_k$ results in an output expressed as $(d_k + d_{k-1})$. When $d_k = d_{k-1} = 1$, the output is 2, and the output level of waveform equalizer 4 is a trivalue output of (0, 1, 2).

The PR method actively uses a waveform having a nonzero response (correlative waveform) to a single stored elementary waveform at plural discrimination points of the readback signal. As a result, the PR method detects the correlation of the constant time change of a level even when there is interwaveform interference, and is known as an equalization method appropriate to the recording and reproducing characteristics of level-correlated encoding such as (2,7) RLL encoding.

Next, white noise added during the readback and equalization processes is removed from the output x(t) of waveform equalizer 4 (FIG. 11) by low pass filter (LPF) 5. The signal is then sampled by A/D converter 6 at a discrete-time point of the cell width, and the sampled values are quantized.

It should be noted that noise is added by waveform equalizer 4, and is actually output as an error series. The readback digital signal quantized by A/D converter 6 is then processed by Viterbi decoder 7 using a maximum-likelihood (ML) decoding method applying the Viterbi algorithm.

ML decoding does not process each signal value at each discrimination point during the discrimination and decoding process, but processes a signal series of a finite length (constraint length). The Viterbi algorithm is one type of ML decoding method, more specifically a sequential trellis search algorithm for ML sequence detection, and assumes that the received (readback) signal sequence can be expressed by a finite automaton model. The transversal filter waveform equalizer 4 shown in FIG. 12 is also a so-called convolution encoder, and the output therefrom can be expressed as a finite automaton model (a machine whereof the output is determined by the internal state and input). The Viterbi algorithm obtains the path (internal state transition path) whereby the metric (likelihood standard) input at each time point is lowest at each time transition point of the trellis diagram (a diagram showing the output code series generated by a state change process of the encoder according to the input information series) of a finite state machine encoder.

With the magneto-optical recording and reproducing system shown in FIG. 11, Viterbi decoding is used to decode the combination of (2,7) RLL and PR(1,1) encoding. If magneto-optical drive 3 and waveform equalizer 4 are treated as a finite state machine (convolution encoder), the corresponding state transition diagram for their internal states is shown in FIG. 13. The input information series is output $d_t$ (=0, 1) of precoder 2, and the output code series is output $x_t$ of waveform equalizer 4. Waveform equalizer 4 is the PR(1,1) circuit, and the detected output $x_t$ therefrom is 0, 1, or 2. Furthermore, because it comprises only one delay element, there are $2^1 = 2$ internal states. If the internal state is expressed as $u_{t-1}$, internal state $u_{t-1}=0$ corresponds to state $S_1$, and internal state $u_{t-1}=1$ corresponds to state $S_2$. Note that when the internal state is $S_1$, state $S_1$ is held when the input is 0, and the output is therefore 0. As shown in FIG. 13, the input/output relationship $d_t/x_t$ is expressed as 0/0. When the input is 1, the internal state shifts to state $S_2$, and the output is 1. When input 1 is input to state $S_2$, state $S_2$ is held and the output is 2. When input 0 is input, the internal state shifts to state $S_1$, and the output is 1.

FIG. 14 is a trellis diagram of the time-based internal state changes based on the state transition diagram shown in FIG. 13. In FIG. 14, the dotted directed lines show the transition resulting from input 0, and the solid directed lines show the transition resulting from input 1; the $d_t/x_t$ relationship is shown on each directed line. Simply stated, the Viterbi algorithm first calculates the metrics of plural branches merging at each time point (t−2~t+2), using, for example, the Hamming distance as the branch metric. The path with the smallest branch metric is then saved as the survivor path. If there is more than one path with the same branch metric, any one of the paths may be selected. Because the initial state, the constraint length (which is a guide to the correlation of the encoded sequence), and the final state are known to the demodulation side, it is possible to trace the history of the survivor path from the unique final state to arrive at a unique initial state, and thereby determine the most probable path. By thus considering the correlation of state transitions, it is possible to overcome bit errors in the magneto-optical drive 3 and waveform equalizer 4, and the correct (accurate) information series can be demodulated.

A general description of the configuration of a Viterbi decoder 7 is given below. As shown in FIG. 15, a general Viterbi decoder comprises a hypothetical path memory 7a for storing the expected value obtained from the waveform of a data series of a bit count corresponding to the constraint length; an ACS circuit 7b comprising an adder (A), comparator (B), and selector (C), and obtaining by means of adder (A) the sum of the pre-calculated path metric and the square of the difference of the sample value from A/D converter 6 and the expected value from the hypothetical path memory 7a, comparing the additive outputs by means of comparator (C), and then selecting the smaller value by means of selector (C); a path memory 7c for storing the last values of the selected hypothetical paths; and a path selector 7d for selecting the path with the smallest path metric, and outputting the data at the tail end of the path as the demodulation data.

Demodulator 8 located at the last stage of the system shown in FIG. 11 demodulates the error correction code $\{a_i\}$ obtained from Viterbi decoder 7 to restore the information sequence $\{A_i\}$, and thus effectively inverses the conversion applied by (2,7) RLL and NRZI encoding.

The following problems are presented by the magneto-optical recording and reproducing system described above.

(1) If the transfer function of recording and reproducing system magneto-optical drive 3 in the magneto-optical recording and reproducing system shown in FIG. 11 is H(f), and the transfer function of waveform equalizer 4 is E(f), it is necessary to determine the weighting coefficients $c_j$ of waveform equalizer 4 necessary and sufficient to satisfy equation [8] below for PR(1,1) partial response coding.

$$H(f) \cdot E(f) = PR_{11}(f) \quad [8]$$

where $PR_{11}(f)$ is the transfer function for PR(1,1). If a delay operator $D=\exp(-j\omega T_b)$ is used, PR(1,1) can be digitally expressed as $G(\omega)=(1+D)$ where $\omega=2\pi f$. Thus, for transfer function $PR_{11}(f)$, $|G(f)|=|2 \cos(\pi f T_b)|$ where the cut-off frequency $f_{11}=\frac{1}{2}T_b$.

FIG. 16 is a graph of the frequency characteristics of a transfer function with a low recording density. Because the recording density is low, the cut-off frequency $f_H$ of the recording and reproducing channel transfer function H(f) is higher than the cut-off frequency $f_{11}$ of transfer function $PR_{11}(f)$. If the waveform equalizer 4 is constructed with a transfer function E(f) that drops to zero at cut-off frequency $f_{11}$ in this case, an error-free equalization state can, in principle, be achieved.

However, when the recording density is increased, the cut-off frequency $f_H$ of transfer function H(f) drops due to interwaveform interference, and becomes, as shown in FIG. 17, relatively lower than the cut-off frequency $f_{11}$ of transfer function $PR_{11}(f)$. In this case there is a region ($f_H \leq f \leq f_{11}$) wherein equation [8] is not satisfied, and equalization error increases in principle. An increase in equalization error means that correction of intersymbol interference weakens, and, thus, high density recording and reproducing is naturally limited.

(2) Even when the recording density is relatively low as shown in FIG. 16, the high band side of transfer function E(f) suggests a value or 1 or greater, and thus acts to emphasize noise. Furthermore, while it is possible to use delay circuits 4a with a short delay time and increase in hardware the number of taps to waveform equalizer 4 as a means of reducing equalization error (least square error), this will obviously increase the complexity of waveform equalizer 4, additive noise increases dramatically with the increase in the number of delay elements, and high band emphasis of noise occurs. This is, therefore, not a particularly effective means of suppressing equalization error. Conversely, the bit error rate increases, and the bit error rate is not significantly improved even after Viterbi decoding is applied.

Therefore, an object of the present invention is to provide an information recording and reproducing apparatus whereby high density recording can be improved and the bit error rate can be reduced by means of finding the optimum partial response method that can be combined with Viterbi decoding to achieve optimum performance from the overall system comprising the encoding circuit, recording and reproducing system, and demodulation circuit.

SUMMARY OF THE INVENTION

To achieve the above object, the present invention employs a partial response (PR) method using specialized weighting coefficients in an information recording and reproducing apparatus, such as a magneto-optical recording and reproducing apparatus or optical recording and reproducing apparatus, for reproducing information by means of an optical head.

An information recording and reproducing apparatus according to the first embodiment of the invention comprises: a coding and modulating means for RLL (runlength-limited) encoding a digital information sequence to produce a RLL encoded digital information sequence and for NRZI (non-return-to-zero inverted) encoding the RLL encoded digital information sequence; a recording and reproducing means which includes an optical head for recording the NRZI encoded sequence to an information recording medium, and for subsequently reproducing an analog signal from the NRZI encoded sequence as an elementary waveform sequence from the information recording medium using the optical head; a waveform equalization means comprising a transversal filter having delay elements of a predetermined delay time, e.g. $T_b/m$, for waveform equalizing the elementary waveform supplied from the recording and reproducing means by applying transfer function G(D) to the elementary waveform sequence to produce an equalized waveform sequence where transfer function $G(D)= PR(c_0, c_1, \ldots c_n)=(c_0+c_1D+c_2D^2+\ldots c_nD^n)$, D is the delay operator, the delay time of which is the cell width $T_b$ of the NRZI encoded sequence, and $c_0, c_1, \ldots c_n$ are weighting coefficients; an analog/digital (A/D) conversion means for sampling the equalized waveform sequence at a sampling rate of, for example, $T_b/m$, and then quantizing the sampled values; a Viterbi decoding means for comparing the digital output of the A/D conversion means with a particular expected value to obtain the most probable path as a decoded digital information sequence; a demodulating means for demodulating the decoded digital information sequence by applying the inverse of RLL encoding and NRZI encoding to the decoded digital information sequence; and a low pass filter means after the waveform equalization means or analog/digital (A/D) conversion means for removing high frequency noise from the output of the waveform equalization means or analog/digital (A/D) conversion means. This information recording and reproducing apparatus is further characterized by the numeric sequence of weighting coefficients $\{c_0, c_1, \ldots c_n\}$ being a real number sequence; the increasing and decreasing sequences of sequence indices being identical; and at least weighting coefficients $c_0$, $c_1$, $c_2$ being not equal to zero ($\neq 0$).

An information recording and reproducing apparatus according to the second embodiment of the invention comprises: a coding and modulating means for a RLL (run-length-limited) encoding digital information sequence to produce a RLL encoded digital information sequence and for NRZI (non-return-to-zero inverted) encoding the RLL encoded digital information sequence; a recording and reproducing means which includes an optical head for recording the NRZI encoded sequence to an information recording medium, and for subsequently reproducing an analog signal as an elementary waveform sequence from the information recording medium using the optical head; an analog/digital (A/D) conversion means for sampling the reproduced elementary waveform stream at a sampling rate of 1/m (where m is a natural number) the cell width $T_b$ of the NRZI encoded sequence, and for quantizing the signal samples to produce a digital output; a waveform equalization means comprising a transversal filter having delay elements of a predetermined delay time, e.g., $T_b/m$, for waveform equalizing the digital output from the A/D conversion means by applying transfer function G(D) to the digital output from the A/D conversion means where transfer function $G(D)=PR(c_0, c_1, \ldots c_n)=(c_0+c_1D+c_2D^2+\ldots c_nD^n)$, D is the delay operator, the delay time of which is cell width $T_b$, and $c_0, c_1, \ldots c_n$ are weighting coefficients; a low pass filter means for removing high frequency noise from the waveform equalized sequence; a Viterbi decoding means for comparing the output of the low pass filter means with a particular expected value to obtain the most probable path as a decoded digital information sequence; and demodulating means for demodulating the decoded digital information sequence by applying the inverse of RLL encoding and NRZI encoding to the decoded digital information sequence. This information recording and reproducing apparatus is further characterized by the numeric sequence of weighting coefficients $\{c_0, c_1, \ldots c_n\}$ being a real number sequence; the increasing and decreasing sequences of sequence indices being identical; and at least weighting coefficients $c_0$, $c_1$, $c_2$ being not equal to zero ($\neq 0$).

In the information recording and reproducing apparatus of the present invention, the numeric sequence of weighting coefficients $\{c_0, c_1, \ldots c_n\}$ is preferably a medium-high distribution sequence of positive real numbers. In particular, the transfer function $G(D)=PR(c_0, c_1, \ldots c_n)$ of the PR method is preferably the transfer function selected from the group of functions PR(1,2,1), PR(1,2,2,1), PR(1,3,3,1) and PR(1,4,6,4,1). More preferably, D is the cubic transfer function $PR(c_0, c_1, \ldots c_n)=(c_0+c_1+c_1D^2+c_0D^3)$. Most preferably, the transfer function G(D) is PR(1,2,2,1)=(1+2D+2D^2+D^3).

The cut-off frequency of the low pass filter in this information recording and reproducing apparatus can be set within the range $\frac{1}{2}T_b \sim \frac{1}{6}T_b$.

A Viterbi decoding means achieving the PR(1,2,2,1) method specifically treats the recording and reproducing means and the equalization means as a convolution encoder, includes the states of the NRZI encoded sequence input to the convolution encoder as internal states, subtracts the state transitions prohibited by (1,7) RLL encoding and NRZI encoding from the states of the NRZI encoded sequence to obtain the ten internal states $S_0 \sim S_9$, and operates according to a trellis diagram based on these state transitions.

More specifically, in the trellis diagram of these internal states $S_0 \sim S_9$, the state remains as state $S_0$ and outputs 0 from the waveform equalization means when input 0 to the recording and reproducing means is input in state $S_0$, shifts to state $S_1$ and outputs 1 when input 1 is input in state $S_0$, shifts to state $S_2$ and outputs 3 when input 1 is input in state $S_1$, shifts to state $S_8$ and outputs 4 when input. 0 is input in state $S_2$, shifts to state $S_3$ and outputs 5 when input 1 is input in state $S_2$, shifts to state $S_5$ and outputs 5 when input 0 is input in state $S_3$, shifts to state $S_4$ and outputs 6 when input 1 is input in state $S_3$, shifts to state $S_5$ and outputs 5 when input 0 is input in state $S_4$, remains as state $S_4$ and outputs 6 when input 1 is input in state $S_4$, shifts to state $S_6$ and outputs 3 when input 0 is input in state $S_5$, shifts to state $S_7$ and outputs 1 when input 0 is input in state $S_6$, shifts to state $S_9$ and outputs 2 when input 1 is input in state $S_6$, shifts to state $S_0$ and outputs 0 when input 0 is input in state $S_7$, shifts to state $S_1$ and outputs 1 when input 1 is input in state $S_7$, shifts to state $S_6$ and outputs 3 when input 0 is input in state $S_8$, and shifts to state $S_2$ and outputs 3 when input 1 is input in state $S_9$.

When a PR method where the numeric sequence of the weighting coefficients $\{c_0, c_1, \ldots c_n\}$ of the PR method is a real number sequence, the increasing and decreasing sequences of sequence indices are identical, and at least weighting coefficients $c_0, c_1, c_2$ are not equal to zero ($\neq 0$), is used, the transfer function of the recording and reproducing apparatus will closely match the transfer function of a PR method using the product of the transfer functions H(f) and E(f) of the recording and reproducing means and the waveform equalization means, respectively. Equalization error can therefore be reduced, and high density recording can be achieved. Because the constraint length is longer with this method than with the PR(1,1) method, the bit error correction rate can be improved by means of the Viterbi decoder.

It is preferable to use a PR method where the numeric sequence of weighting coefficients $(c_0, c_1, \ldots c_n)$ is a medium-high distribution sequence, e.g., PR(1,2,1), PR(1,2,2,1), PR(1,3,3,1) or PR(1,4,6,4,1), but the PR(1,2,2,1) has been demonstrated to achieve the best high density recording and bit error correction characteristics.

Because the cut-off frequency of the PR(1,2,2,1) transfer function is $\frac{1}{3}T_b$, low relative to the $\frac{1}{2}T_b$ cut-off frequency of the PR(1,1) transfer function, equalization error can also be suppressed to an extremely low level without increasing the number of taps of the equalization means, and interwaveform interference suppression is strong. That it is not necessary to increase the number of taps to the equalization means obviously contributes to a simpler structure in the equalization means, avoids additive noise, and suppresses bit errors. Demodulation capacity is therefore also improved.

Because the cut-off frequency of the PR(1,2,2,1) transfer function is $\frac{1}{3}T_b$, the cut-off frequency of the low pass filter can be set to $\frac{1}{2}T_b$ or less (specifically, $\frac{1}{2}T_b \sim \frac{1}{6}T_b$) to achieve an excellent noise elimination effect. This also contributes to an improved error correction rate.

When the Viterbi decoding means treats the recording and reproducing means and the equalization means as a convolution encoder, includes the state of the NRZI encoded sequence input thereto as internal states, subtracts the state transitions prohibited by (1,7) RLL encoding and NRZI encoding from the states of the NRZI encoded sequence to obtain the ten internal states $S_0 \sim S_9$, and operates according to a trellis diagram based on these state transitions, the minimum free distance increases in relation to the increase in the number of internal states. As result, the code correlation becomes stronger, and the error correction rate improves.

Other objects and attainments, together with a fuller understanding of the invention, will become apparent and appreciated by referring to the following description and claims taken in conjunction with the accompanying drawings.

BRIEF DESCRIPTION OF THE DRAWINGS

FIG. 1 is a block diagram showing the overall configuration of a magneto-optical recording and reproducing apparatus according to the first embodiment of the invention;

FIG. 2 is a waveform diagram used to describe the partial response method, including PR(1,2,2,1);

FIG. 3 is a state transition diagram of the internal states when the recording and reproducing system and waveform equalizer are treated as a constraint length 4 trellis encoding means in the first embodiment of the invention;

FIG. 4 is a trellis diagram of the time-based internal state changes based on the state diagram shown in FIG. 3;

FIG. 5 is a trellis diagram based on the state diagram of the internal states when the recording and reproducing system and waveform equalizer are treated as a constraint length 5 trellis encoding means in the first embodiment of the invention;

FIG. 6 is a graph of the transfer function H(f) of the recording and reproducing system, and transfer functions $PR_{11}(f)$ and $PR_{1221}(f)$ in the first embodiment of the invention;

FIG. 7 is an ideal eye pattern (eye diagram) of the equalized waveform output by the waveform equalizer when the NRZI encoded (1,7) RLL coded signal is reproduced in the first embodiment of the invention;

FIG. 8 is a graph showing the relationship of equalization error to the number of taps in the waveform equalizer in the PR(1,2,2,1) method of the present invention and the PR(1,1) method of the prior art;

FIG. 9 is a graph of the relationship between the signal to noise ratio (SNR) of the readback signal, and the bit error rate (BER) of the data after demodulation of the readback signal, where the readback signal is read from an optical recording medium to which 0,1 data of a maximum length period sequence (maximum period sequence) is recorded as the recording data at a 0.25 μm/bit~0.35 μm/bit recording density in the first embodiment of the invention;

FIG. 10 is a block diagram showing the overall configuration of a magneto-optical recording and reproducing apparatus according to the second embodiment of the invention;

FIG. 11 is a block diagram showing the overall configuration of a conventional magneto-optical recording and reproducing apparatus;

FIG. 12 is a block diagram showing the general configuration of a transversal-type waveform equalizer used in a magneto-optical recording and reproducing apparatus;

FIG. 13 is a state diagram of the internal states of the recording and reproducing system and waveform equalizer shown in FIG. 11 treated as a finite state automaton (constraint length 1 convolution encoder);

FIG. 14 is a trellis diagram based on the state diagram shown in FIG. 13;

FIG. 15 is a block diagram showing the general configuration of a Viterbi decoding means used in a magneto-optical recording and reproducing apparatus;

FIG. 16 is a graph of the transfer function H(f) of the recording and reproducing system and the transfer function E(f) of the waveform equalizer in FIG. 11, and transfer function $PR_{11}(f)$ of the PR(1,1) method, when the recording density is low; and FIG. 17 is a graph of the transfer function H(f) of the recording and reproducing system and the transfer function E(f) of the waveform equalizer in FIG. 11, and transfer function $PR_{11}(f)$ of the PR(1,1) method, when the recording density is high.

DESCRIPTION OF THE PREFERRED EMBODIMENTS

Embodiment 1

FIG. 1 is a block diagram showing the overall configuration of a magneto-optical recording and reproducing apparatus according to the first embodiment of the invention. In FIG. 1, coding and modulating means 11 comprises a (1,7) RLL (runlength-limited) encoder for RLL encoding the input data bit sequence $\{A_i\}$ (a digital information sequence) using the minimum run constraint d=1 and maximum run constraint k=7; and an NRZI modulator for converting the (1,7) RLL code sequence to an NRZI (non-return-to-zero inversion) code. Constraint k (=7) of the (1,7) RLL code rule offers the advantage of being able to suppress intersymbol interference. In addition, the mark length modulation by the NRZI modulator helps to improve the recording density. The encoded sequence $\{a_i\}$ output from coding and modulating means 11 is then recorded on the magnetic thin-film of the magneto-optical recording medium as the elementary waveform sequence to be recorded using the thermal effect of the semiconductor laser (or other means) of magneto-optical drive 3 in the recording and reproducing system.

During the reproduction process, the readback elementary waveform sequence e(t) read from the magneto-optical recording medium by means of the optical head of magneto-optical drive 3 is then waveform equalized as the detected signal series by waveform equalizer 14, which is described below.

A transversal filter is used in this embodiment for waveform equalizer 14. As shown in FIG. 12, this filter comprises a serial delay stage (SR) of (2L) serially-connected delay circuits 4a each having a tap and a delay time T; (2L+1) weighting circuits (multipliers) 4b for multiplying the output from each tap (signal discrimination point) by a weighting coefficient $c_j$ (where j=−L, . . . , −1, 0,+1, . . . ,+L); and an adder 4c for obtaining the total sum of the weighted products. Note that it is not necessary for the delay time T of the delay circuits 4a to be equal to the cell width $T_b$ of the NRZI encoded sequence, and delay circuits 4a of delay time $T=T_b/m$, for example, may be used to reduce waveform equalization error.

The weighting coefficients $c_j$ of waveform equalizer 14 in this embodiment are set so as to achieve a PR(1,2,2,1) partial response characteristic in recording and reproducing system, including the waveform equalizer. Because $c_0=1$, $c_1=2$, $c_2=2$, and $c_3=1$ with the PR(1,2,2,1) characteristic, the output waveform (impulse response waveform) h(t) of waveform equalizer 14 can be obtained by equation [9] derived from equation [4] when an impulse is applied to the input of magneto-optical drive 3.

$$h(t)=r(t/T_b)+2r(t/T_b-1)+2r(t/T_b-2)+r(t/Tb-3) \qquad [9]$$

Because $T=T_b$, the response waveform discrimination point occurs at every $T_b$, the amplitude value of the impulse response changes in the sequence 0→1→2→ 2→1→0 as shown in FIG. 2, and the impulse input can be detected by determining the amplitude value. If a delay operator $D=\exp(-j\omega T_b)$ is used, PR(1,2,2,1) can be digitally expressed as $G(D)=(1+2D+2D^2+D^3)$ where $\omega=2\pi f$. The output for input $a_k$ at time k can therefore be expressed as $(a_k+2a_{k-1}+2a_{k-2}+a_{k-3})$. When $a_k=a_{k-1}=ak_{-2}=ak-3=1$, the output is 6, and the output signal level of waveform equalizer 14 is a seven-value output of (0, 1, 2, 3, 4, 5, 6). The transfer function $PR_{1221}(f)$ of PR(1,2,2,1) is therefore $|G(f)|=|2\cos(\pi fT)\{1+2\cos(2\pi fT)\}^{1/2}|$, and the cut-off frequency $f_{1221}=\frac{1}{3}T_b$.

Next, white noise added during the readback and equalization processes is removed from the output x(t) of waveform equalizer 14 by low pass filter (LPF) 15. The cut-off frequency of LPF 15 is in the range $\frac{1}{3}T_b \sim \frac{1}{6}T_b$ where $T_b$ is the 1-bit delay time (cell width) because the cut-off frequency $f_{1221}$ of transfer function $PR_{1221}(f)$ is $\frac{1}{3}T_b$. The low pass filter cut-off frequency is preferably in the range $\frac{1}{4}T_b \sim \frac{1}{6}T_b$.

The LPF 15 output is then sampled by A/D converter 16 at a discrete-time point of the cell width, and the sampled values are quantized.

The readback digital signal quantized by A/D converter 16 is then decoded by Viterbi decoder 17 applying a maximum likelihood decoding method using the Viterbi algorithm. The Viterbi decoding method applied in this embodiment is adapted to the combination of (1,7) RLL, NRZI, and PR(1,2,2,1) encoding. If magneto-optical drive 3 and waveform equalizer 14 are treated as a finite state machine (a trellis encoder of constraint length 4), the corresponding state transition diagram of the internal states is shown in FIG. 3.

The input information series is output at (=0, 1) of the coding and modulating means 11, and the output code series is output $x_t$ of waveform equalizer 14. The output $x_t$ levels of waveform equalizer 14 are 0, 1, 2, 3, 4, 5, or 6. There is a maximum possible $2^3=8$ internal states because there are three delay elements T, but the d=1 constraint of (1,7) RLL encoding limits the actual number of internal states to six. If the internal states are expressed as $(u_{t-1}, u_{t-2}, u_{t-3})$, state $S_0=(0,0,0)$, state $S_1=(1,0,0)$, state $S_2=(1,1,0)$, state $S_3=(1,1,1)$, state $S_4=(0,1,1)$, and state $S_5=(0,0,1)$ exist, but states (1,0,1) and (0,1,0) do not exist.

Note that in state $S_0$, state $S_0$ is held when input 0 is input, and the output is 0. Note, also, that input/output $=a_t/x_t$, and is expressed as 0/0 in this case. When input 1 is input, the state changes to state $S_1$, and the output is 1. In state $S_1$, the next input is also 1, causing a transition to state $S_2$ and yielding an output of 3. In state $S_2$, input 1 causes a transition to state $S_3$ and output 5; input 0 causes a transition to state $S_4$ and output 4. In state $S_3$, input 1 causes state $S_3$ to be held and output 6; input 0 causes a transition to state $S_4$ and output 5. In state $S_4$, the next input is also 0, causing a transition to state $S_5$ and yielding an output of 3. In state $S_5$, input 0 causes a transition to state $S_0$ and output 1; input 1 causes a transition to state $S_1$ and output 2.

FIG. 4 is a trellis diagram of the time-based internal state changes based on the state transition diagram shown in FIG. 3. In FIG. 4, the dotted directed lines show the transition resulting from input 0, and the solid directed lines show the transition resulting from input 1; the input/output relationship $a_t/x_t$ is shown on each directed line. The Viterbi algorithm for the convolution encoding system using this trellis diagram is substantially identical to that described above. Specifically, the metrics of plural branches merging to each state at each time point (t−3~t+3) are first calculated, the path with the smallest branch metric is then saved as the survivor path, and the history of the survivor path is then traced from the unique final state to arrive at a unique initial state and thereby determine the most probable path. It is to be noted that Viterbi decoder 17 is constructed identically to that shown in FIG. 15.

If the internal states also including the current input $d_t=u_t$ are expressed as states $(u_t, u_{t-1}, u_{t-2}, u_{t-3})$ for the purpose of improving the error correction rate, magneto-optical drive 3 and waveform equalizer 14 can be treated as a constraint length 5 convolution encoder (trellis encoder). While there is a maximum $2^4=16$ possible internal states with such an encoding system, the d=1 constraint of (1,7) RLL encoding limits the actual number of internal states to ten ($S_0 \sim S_9$). The minimum free distance (the minimum Hamming weight on the trellis diagram passing from the initial state through another state, and returning once again to the initial state) becomes longer in an amount equivalent to the addition of four internal states, and the code correlation is therefore strengthened and the error correction rate improved when compared with the case shown in FIG. 3.

FIG. 5 is a trellis diagram of the time-based internal state changes for this expanded number of internal states. As shown in this trellis diagram, when input 0 is input in state $S_0$, state $S_0$ is held and the output of the waveform equalizer is 0; when input 1 is input in state $S_0$, the state changes to state $S_1$, and the output is 1. In state $S_1$, input 1 causes a transition to state $S_2$ and output 3. In state $S_2$, input 0 causes a transition to state $S_8$ and output 4; input 1 causes a transition to state $S_3$ and output 5. In state $S_3$, input 0 causes a transition to state $S_5$ and output 5; input 1 causes a transition to state $S_4$ and output 6. In state $S_4$, input 0 causes a transition to state $S_5$ and output 5; input 1 causes state $S_4$ to be held and output 6. In state $S_5$, input 0 causes a transition to state $S_6$ and output 3. In state $S_6$, input 0 causes a transition to state $S_7$ and output 1; input 1 causes a transition to state $S_9$ and output 2. In state $S_7$, input 0 causes a transition to state $S_0$ and output 0; input 1 causes a transition to state $S_1$ and output 1. In state $S_8$, input 0 causes a transition to state $S_6$ and output 3. In state $S_9$, input 1 causes a transition to state $S_2$ and output 3.

Demodulator 18 located at the last stage of the system shown in FIG. 1 demodulates the error correction code $\{a_i\}$ obtained from Viterbi decoder 17 to restore the information sequence $\{A_i\}$, and thus effectively inverses the conversion applied by (1,7) RLL and NRZI encoding. It is to be noted that demodulator 18 comprises a postcoding circuit having the inverse transfer function of waveform equalizer 14.

FIG. 6 is a graph showing the transfer function $PR_{1221}(f)$ of PR(1,2,2,1) assuming a normalized frequency of $f_b=fT$. As stated above, transfer function $PR_{1221}(f)=|2\cos(\pi fT)\{1+2\cos(2\pi fT)\}^{1/2}|$, and the cut-off frequency $f_{b1221}=\frac{1}{3}T_b 0.33$. However, the transfer function $PR_{11}(f)$ of PR(1,1) is $|2\cos(\pi f_b)|$, and the cut-off frequency $f_{b11}=\frac{1}{2}=0.5$. As a result, cut-off frequency $f_{b1221}$ will always be on the low frequency side of cut-off frequency $f_{b11}$. Therefore, even if interwaveform interference occurs as a result of high density recording, and the cutoff frequency $f_{bH}$ of the frequency characteristics of transfer function H(f) of magneto-optical drive 3 becomes lower than the cut-off frequency $f_{b11}$ of transfer function $PR_{11}(f)$, there is a transfer function E(f) of waveform equalizer 14 that will satisfy equation [10] until $f_{bH}$ becomes less than or equal to $f_{b1221}$.

$$H(f) \cdot E(f) = PR_{1221}(f) \qquad [10]$$

By thus assuring waveform equalization, higher density recording than the prior art can be achieved. Furthermore, because $PR_{1221}(f)$ converges to 1 more closely following the transfer function H(f) of the magneto-optical drive than $PR_{11}(f)$ in FIG. 6, the transfer function $E(f)$ of waveform equalizer 14 can be lower than that of the conventional PR(1,1) method, and can be set closer to 1. High band emphasis of noise can therefore be suppressed by a corresponding amount, and bit errors reduced.

FIG. 7 is an optimum eye pattern (eye diagram) of the equalized waveform output by waveform equalizer 14 when the NRZI encoded (1,7) RLL coded signal is reproduced. This eye diagram overlays all possible waveform combinations of any two adjacent cells of a certain unit interval (cell width) of the elementary waveform series. For example, at time $t/T_b=1$, the intersections of the curves clearly converge at the discrete points of the 7 values (0, 1, 2, 3, 4, 5, 6), and do not pass between these discrete points. A sufficiently wide margin can therefore be obtained, and signal identification is made easier by providing a threshold element with a threshold value between each of these integer values.

FIG. 8 is a graph showing the relationship between equalization error and the number of taps in the waveform equalizer.

The value of equalization error (the least square error of the optimum PR(1,1) waveform and the actual output waveform of the waveform equalizer) is high with the conventional PR(1,1) method. This is because the PR(1,1) transfer function is greatly separated from the transfer function $H(f)$ of the magneto-optical drive as will be understood from a comparison of the transfer function curves in FIG. 6, and waveform equalization is thus more difficult. Equalization error is approximately 0.13 when there are five taps (discrimination points) to the waveform equalizer, and while equalization error declines as expected as the number of taps increases, equalization error remains relatively high at approximately 0.03 even with 21 taps. Increasing the number of taps also means increasing the number of delay circuits 4a. This accordingly increases the complexity of the waveform equalizer itself, inducing further problems from additive noise and bit error.

With the PR(1,2,2,1) method of the present invention, however, equalization error is already less than 0.02 with only five taps (discrimination points), significantly better than the conventional PR(1,1) method. Because equalization error can be reduced to such a minimal level even with a small number of taps, extreme suppression of intersymbol interference can be achieved, even higher density recording can be achieved, the structure of the waveform equalizer itself can be simplified, and even the waveform equalizer can help reduce the addition of noise.

FIG. 9 is a graph of the relationship between the signal-to-noise ratio (S/N ratio) of the readback signal, and the bit error rate (BER) of the data after demodulation of the readback signal, where the readback signal is read from an optical recording medium to which 0,1 data of a maximum length period sequence (maximum period sequence) is recorded as the recording data at a 0.25 μm/bit ~0.35 μm/bit recording density. The bit error rate declines in the order PR(1,1)→PR(1,2,1)→PR(1,3,3,1)=PR(1,4,6,4,1)→PR(1,2,2,1). What can be inferred from this is that for the numerical sequence $\{c_0, c_1, \ldots c_n\}$ of weighting coefficients in the PR method, the increasing and decreasing sequences of sequence indices is the same medium-high distribution series ($c_0=c_n$, $c_1=c_{n-1}$, $c_2=c_{n-2}$, . . . ), and that at least weighting coefficients $c_0$, $c_1$, $c_2$ are not equal to zero ($\neq 0$). Note that the weighting coefficients are not limited to integer values, and may be expanded to include real numbers as may be necessary.

PR(1,2,2,1) achieves a significant S/N ratio improvement of several decibels when compared with conventional PR(1, 1) encoding, and several partial response methods with various intermediate levels of improvement are shown in FIG. 9. As will be known from FIG. 9, PR(1,3,3,1) and PR(1,4,6,4,1) can also be used to good advantage. It can also be inferred that the numeric series of weighting coefficients is preferably a medium-high series of positive real numbers. However, while PR(1,3,3,1) has nine values, PR(1,4,6,4,1) has seventeen values, thus increasing the number of delay elements in the waveform equalizer and the complexity of the A/D converter, and thus making it necessary to compensate for a decreased S/N ratio due to an increase in noise. It is therefore more preferable to use PR(1,3,3,1) encoding than PR(1,4,6,4,1) encoding. It can therefore be further inferred that, in general, the numeric series of weighting coefficients is a medium-high series of positive real numbers, preferably a series of four elements ($c_0$, $c_1$, $c_2(=c_1)$, $c_3(=c_0)$). It should also be noted that the PR(1,4,4,1) and PR(2,3,3,2) methods each have eleven values; PR(1,5,5,1) has thirteen; PR(1,6,6,1), PR(2,5,5,2), and PR(3,4,4,3) have fifteen; and PR(1,7,7,1) and PR(3,5,5,3) have seventeen. The weighting coefficients in these cases are also not limited to integer values, and may be real numbers as necessary.

Furthermore, low pass filter 15 in the present embodiment is provided as an analog filter immediately after waveform equalizer 14, but may be alternatively provided as a digital filter after A/D converter 16.

Embodiment 2

FIG. 10 is a block diagram showing the overall configuration of a magneto-optical recording and reproducing apparatus according to the second embodiment of the invention. Note that like parts are identified by like reference numbers in FIGS. 1 and 10, and further description thereof is omitted below.

The present embodiment disposes A/D converter 26 immediately following magneto-optical drive 3, and provides a digital waveform equalizer 24 after A/D converter 26. Low pass filter 15 is a digital filter. The sampling frequency of A/D converter 26 may be cell width $T_b$, but is preferably $T_b/m$ (where m is a natural number) as a means of reducing equalization error. Digital waveform equalizer 24 is generally a non-recursive digital filter (finite impulse response (FIR) filter) of which the plural component delay circuits have a delay time of $T_b/m$.

An improvement in high density recording and the error correction rate can also be achieved by thus constructing the waveform equalizer by means of digital circuits.

As described hereinabove, according to the present invention, a PR method is combined with a Viterbi decoding means. In the PR method, the numeric sequence of weighting coefficients $\{c_0, c_1, \ldots c_n\}$ is a real number sequence, the increasing and decreasing sequences of sequence indices are identical, and at least weighting coefficients $c_0$, $c_1$, $c_2$ are not equal to zero ($\neq 0$). The following effects are thus obtained.

(1) The transfer function of the recording and reproducing apparatus of the present invention well matches the transfer function of a PR method using the product of the transfer function $H(f)$ of the magneto-optical drive and the transfer function $E(f)$ of the waveform equalization means. It is therefore possible to reduce equalization error, and a high recording density can be achieved. Bit error correction is also improved by the Viterbi decoding means because the constraint length is longer than that of the conventional PR(1,1) method.

(2) The effect described in (1) is significant when the numeric sequence of weighting coefficients $\{c_0, c_1, \ldots c_n\}$ is a medium-high distribution sequence PR method, e.g., PR(1,2,1), PR(1,2,2,1), PR(1,3,3,1) or PR(1,4,6,4,1).

(3) When the PR(1,2,2,1) method in particular is used, the present invention achieves outstanding high density recording and bit error correction. Equalization error can also be suppressed to an extremely low level without increasing the number of taps of the equalization means, and intersymbol interference suppression is high, because the cut-off frequency of the PR(1,2,2,1) transfer function is $\frac{1}{3}T_b$, low relative to the $\frac{1}{2}T_b$ cut-off frequency of the PR(1,1) transfer function. That it is not necessary to increase the number of equalization means taps obviously contributes to a simpler structure in the equalization means, avoids additive noise, and suppresses bit errors. Demodulation capacity is therefore also improved.

The cut-off frequency of the low pass filter can also be set at $\frac{1}{2}T_b$ or less, and the noise removal effect is significant, because the cut-off frequency of the PR(1,2,2,1) transfer function is $\frac{1}{3}T_b$. This also contributes to improving the error correction rate.

Furthermore, because the PR(1,2,2,1) method uses seven values for code detection in relation to the cubic transfer function of the other delay elements D, it is possible to suppress an increase in the number of delay elements in the waveform equalizer, and the complexity of the A/D converter construction.

(4) When the (1,7) RLL coding rule, NRZI coding rule, and PR(1,2,2,1) method are combined, and the Viterbi decoding means also includes the states of the input encoded sequences as internal states and operates using a trellis diagram based on these state changes, the minimum free distance increases in relation to the increase in the number of internal states. As a result, the code correlation becomes stronger, and the error correction rate improves.

While the invention has been described in conjunction with several specific embodiments, it is evident to those skilled in the art that many further alternatives, modifications and variations will be apparent in light of the forgoing description. Thus, the invention described herein is intended to embrace all such alternative, modifications, applications and variations as may fall within the spirit and scope of the appended claims.

What is claimed is:

1. An information recording and reproducing apparatus, comprising:

coding and modulating means for RLL (runlength-limited) encoding a digital information sequence to produce a RLL encoded digital information sequence and for NRZI (non-return-to-zero inverted) encoding said encoded digital information sequence;

recording and reproducing means, including an optical head, for recording said NRZI encoded sequence on an information recording medium and for subsequently reproducing an analog signal from said NRZI encoded sequence as an elementary waveform sequence from said information recording medium using said optical head;

waveform equalization means, comprising a transversal filter having delay elements of a predetermined delay time, for waveform equalizing the elementary waveform sequence supplied from said recording and reproducing means by applying transfer function G(D) to the elementary waveform sequence to produce an equalized waveform sequence where transfer function $G(D)=PR(c_0, c_1, \ldots c_n)=(c_0+c_1D+c_2D^2+ \ldots c_nD^n)$, D is a delay operator, the delay time of which is cell width $T_b$ of said NRZI encoded sequence, and $c_0, c_1, \ldots c_n$ are weighting coefficients;

low pass filter means for removing high frequency noise from the equalized waveform sequence supplied by said waveform equalization means;

analog/digital (A/D) conversion means for sampling and quantizing the equalized waveform sequence provided by said waveform equalization means via said low pass filter means to produce a digital output;

Viterbi decoding means for comparing the digital output of said A/D conversion means with a particular expected value to obtain a most probable path as a decoded digital information sequence; and demodulating means for demodulating the decoded digital information sequence by applying the inverse of RLL encoding and NRZI encoding to the decoded digital information sequence;

wherein the numeric sequence of the weighting coefficients $\{c_0, c_1, \ldots c_n\}$ are a real number sequence;

the increasing and decreasing sequences of sequence indices are identical; and at least weighting coefficients $c_0, c_1, c_2$ are not equal to zero.

2. An information recording and reproducing apparatus, comprising:

coding and modulating means for RLL (runlength-limited) encoding a digital information sequence to produce a RLL encoded digital information sequence and for NRZI (non-return-to-zero inverted) encoding said RLL encoded digital information sequence;

recording and reproducing means, including an optical head, for recording said NRZI encoded sequence on an information recording medium and for subsequently reproducing an analog signal from said NRZI encoded sequence as an elementary waveform sequence from said information recording medium using said optical head;

analog/digital (A/D) conversion means for sampling the reproduced elementary waveform sequence at a sampling rate of 1/m (where m is a natural number) the cell width $T_b$ of said NRZI encoded sequence, and for quantizing signal samples to produce a digital output;

waveform equalization means, comprising a transversal filter having delay elements of a predetermined delay time, for waveform equalizing the digital output from said A/D conversion means by applying transfer function G(D) to the digital output from said A/D conversion means to produce an equalized waveform sequence where transfer function $G(D)=PR(c_0, c_1, \ldots c_n)=(c_0+c_1D+c_2D^2+ \ldots c_nD^n)$, D is a delay operator, the delay time of which is cell width $T_b$, and $c_0, c_1, \ldots c_n$ are weighting coefficients;

low pass filter means for removing high frequency noise from the waveform equalized sequence; and Viterbi decoding means for comparing the output of said low pass filter means with a particular expected value to obtain a most probable path as a decoded digital information sequence; and demodulating means for demodulating the decoded digital information sequence by applying the inverse of RLL encoding and NRZI encoding to the decoded digital information sequence;

wherein the numeric sequence of the weighting coefficients $\{c_0, c_1, \ldots c_n\}$ are a real number sequence;

the increasing and decreasing sequences of sequence indices are identical; and at least weighting coefficients $c_0$, $c_1$, $c_2$ are not equal to zero.

3. The information recording and reproducing apparatus according to claim 1 wherein the numeric sequence of weighting coefficients $\{c_0, c_1, \ldots c_n\}$ is a medium-high distribution sequence of positive real numbers.

4. The information recording and reproducing apparatus according to claim 3 wherein the transfer function $G(D)= PR(c_0, c_1, \ldots c_n)$ is a transfer function selected from the group of functions PR(1,2,1), PR(1,2,2,1), PR(1,3,3,1) and PR(1,4,6,4,1).

5. The information recording and reproducing apparatus according to claim 4 wherein the transfer function $G(D)$ is equal to $PR(1,2,2,1)=(1+2D+2D^2+D^3)$.

6. The information recording and reproducing apparatus according to claim 5 wherein the cut-off frequency of said low pass filter means is within the range $\frac{1}{2}T_b \sim \frac{1}{6}T_b$.

7. The information recording and reproducing apparatus according to claim 5 wherein said Viterbi decoding means treats said recording and reproducing means and said equalization means as a convolution encoder, includes the states of the NRZI encoded sequence input thereto as internal states, subtracts the state transitions prohibited by (1,7) RLL encoding and NRZI encoding from the states of the NRZI encoded sequence to obtain ten internal states S0~S9, and operates according to a trellis diagram based on these state transitions.

8. The information recording and reproducing apparatus according to claim 7 wherein in the state transition diagram of internal states $S_0$~$S_9$, the state remains as state $S_0$ and outputs 0 from said waveform equalization means when input 0 to said recording and reproducing means is received as an input in state $S_0$, shifts to state $S_1$ and outputs 1 when 1 is received as an input in state $S_0$, shifts to state $S_2$ and outputs 3 when 1 is received as an input in state $S_1$, shifts to state $S_8$ and outputs 4 when 0 is received as an input in state $S_2$, shifts to state $S_3$ and outputs 5 when 1 is received as an input in state $S_2$, shifts to state $S_5$ and outputs 5 when 0 is received as an input in state $S_3$, shifts to state $S_4$ and outputs 6 when 1 is received as an input in state $S_3$, shifts to state $S_5$ and outputs 5 when 0 is received as an input in state $S_4$, remains as state $S_4$ and outputs 6 when 1 is received as an input in state $S_4$, shifts to state $S_6$ and outputs 3 when 0 is received as an input in state $S_5$, shifts to state $S_7$ and outputs 1 when 0 is received as an input in state $S_6$, shifts to state $S_9$ and outputs 2 when 1 is received as an input in state $S_6$, shifts to state $S_0$ and outputs 0 when 0 is received as an input in state $S_7$, shifts to state $S_1$ and outputs 1 when 1 is received as an input in state $S_7$, shifts to state $S_6$ and outputs 3 when 0 is received as an input in state $S_8$, and shifts to state $S_2$ and outputs 3 when 1 is received as an input in state $S_9$.

9. The information recording and reproducing apparatus according to claim 6 wherein said Viterbi decoding means treats said recording and reproducing means and said equalization means as a convolution encoder, includes the states of the NRZI encoded sequence input thereto as internal states, subtracts the state transitions prohibited by (1,7) RLL encoding and NRZI encoding from the states of the NRZI encoded sequence to obtain ten internal states S0~S9, and operates according to a trellis diagram based on these state transitions.

10. The information recording and reproducing apparatus according to claim 9 wherein in the state transition diagram of internal states $S_0$~$S_9$, the state remains as state $S_0$ and outputs 0 from said waveform equalization means when input 0 to said recording and reproducing means is received as an input in state $S_0$, shifts to state $S_1$ and outputs 1 when 1 is received as an input in state $S_0$, shifts to state $S_2$ and outputs 3 when 1 is received as an input in state $S_1$, shifts to state $S_8$ and outputs 4 when 0 is received as an input in state $S_2$, shifts to state $S_3$ and outputs 5 when 1 is received as an input in state $S_2$, shifts to state $S_5$ and outputs 5 when 0 is received as an input in state $S_3$, shifts to state $S_4$ and outputs 6 when 1 is received as an input in state $S_3$, shifts to state $S_5$ and outputs 5 when 0 is received as an input in state $S_4$, remains as state $S_4$ and outputs 6 when 1 is received as an input in state $S_4$, shifts to state $S_6$ and outputs 3 when 0 is received as an input in state $S_5$, shifts to state $S_7$ and outputs 1 when 0 is received as an input in state $S_6$, shifts to state $S_9$ and outputs 2 when 1 is received as an input in state $S_6$, shifts to state $S_0$ and outputs 0 when 0 is received as an input in state $S_7$, shifts to state $S_1$ and outputs 1 when 1 is received as an input in state $S_7$, shifts to state $S_6$ and outputs 3 when 0 is received as an input in state $S_8$, and shifts to state $S_2$ and outputs 3 when 1 is received as an input in state $S_9$.

11. An information recording and reproducing apparatus, comprising:

coding and modulating means for RLL (runlength-limited) encoding a digital information sequence to produce a RLL encoded digital information sequence and for NRZI (non-return-to-zero inverted) encoding said RLL encoded digital information sequence;

recording and reproducing means, including an optical head, for recording said NRZI encoded sequence on an information recording medium and for subsequently reproducing an analog signal from said NRZI encoded sequence as an elementary waveform sequence from said information recording medium using said optical head;

waveform equalization means, comprising a transversal filter having delay elements of a predetermined delay time, for waveform equalizing the elementary waveform sequence supplied from said recording and reproducing means by applying transfer function G(D) to the elementary waveform sequence to produce an equalized waveform sequence where transfer function $G(D)=PR(c_0, c_1, \ldots c_n)=(c_0+c_1D+c_2D^2+\ldots c_nD^n)$, D is a delay operator, the delay time of which is cell width $T_b$ of said NRZI encoded sequence, and $c_0, c_1, \ldots c_n$ are weighting coefficients;

analog/digital (A/D) conversion means for sampling and quantizing the equalized waveform sequence provided by said waveform equalization means to produce a digital output;

low pass filter means for removing high frequency noise from the output of said A/D conversion means;

Viterbi decoding means for comparing the output of said low pass filter means with a particular expected value to obtain a most probable path as a decoded digital information sequence; and demodulating means for demodulating the decoded digital information sequence by applying the inverse of RLL encoding and NRZI encoding to the decoded digital information sequence;

wherein:
the numeric sequence of the weighting coefficients $\{c_0, c_1, \ldots c_n\}$ are a real number sequence;
the increasing and decreasing sequences of sequence indices are identical; and
at least weighting coefficients $c_0, c_1, c_2$ are not equal to zero.

12. The information recording and reproducing apparatus according to claim 11 wherein the numeric sequence of weighting coefficients $\{c_0, c_1, \ldots c_n\}$ is a medium-high distribution sequence of positive real numbers.

13. The information recording and reproducing apparatus according to claim 12 wherein the transfer function $G(D)=PR(c_0, c_1, \ldots c_n)$ is a transfer function selected from the group of functions PR(1,2,1), PR(1,2,2,1), PR(1,3,3,1) and PR(1,4,6,4,1).

14. The information recording and reproducing apparatus according to claim 4 wherein the transfer function G(D) is equal to $PR(1,2,2,1)=(1+2D+2D^2+D^3)$.

15. The information recording and reproducing apparatus according to claim 14 wherein the cut-off frequency of said low pass filter means is within the range ½$T_b$~⅙$T_b$.

16. The information recording and reproducing apparatus according to claim 15 wherein said Viterbi decoding means treats said recording and reproducing means and said equalization means as a convolution encoder, includes the states of the NRZI encoded sequence input thereto as internal states, subtracts the state transitions prohibited by (1,7) RLL encoding and NRZI encoding from the states of the NRZI encoded sequence to obtain ten internal states S0~S9, and operates according to a trellis diagram based on these state transitions.

17. The information recording and reproducing apparatus according to claim 2 wherein the numeric sequence of weighting coefficients $\{c_0, c_1, \ldots c_n\}$ is a medium-high distribution sequence of positive real numbers.

18. The information recording and reproducing apparatus according to claim 17 wherein the transfer function $G(D)=PR(c_0, c_1, \ldots c_n)$ is a transfer function selected from the group of functions PR(1,2,1), PR(1,2,2,1), PR(1,3,3,1) and PR(1,4,6,4,1).

19. The information recording and reproducing apparatus according to claim 18 wherein the transfer function G(D) is equal to $PR(1,2,2,1)=(1+2D+2D^2+D^3)$.

20. The information recording and reproducing apparatus according to claim 19 wherein the cut-off frequency of said low pass filter means is within the range ½$T_b$~⅙$T_b$.

21. The information recording and reproducing apparatus according to claim 20 wherein said Viterbi decoding means treats said recording and reproducing means and said equalization means as a convolution encoder, includes the states of the NRZI encoded sequence input thereto as internal states, subtracts the state transitions prohibited by (1,7) RLL encoding and NRZI encoding from the states of the NRZI encoded sequence to obtain ten internal states S0~S9, and operates according to a trellis diagram based on these state transitions.

22. The information recording and reproducing apparatus according to claim 21 wherein in the state transition diagram of internal states $S_0$~$S_9$, the state remains as state $S_0$ and outputs 0 from said waveform equalization means when input 0 to said recording and reproducing means is received as an input in state $S_0$, shifts to state $S_1$ and outputs 1 when 1 is received as an input in state $S_0$, shifts to state $S_2$ and outputs 3 when 1 is received as an input in state $S_1$, shifts to state $S_8$ and outputs 4 when 0 is received as an input in state $S_2$, shifts to state $S_3$ and outputs 5 when 1 is received as an input in state $S_2$, shifts to state $S_5$ and outputs 5 when 0 is received as an input in state $S_3$, shifts to state $S_4$ and outputs 6 when 1 is received as an input in state $S_3$, shifts to state $S_5$ and outputs 5 when 0 is received as an input in state $S_4$, remains as state $S_4$ and outputs 6 when 1 is received as an input in state $S_4$, shifts to state $S_6$ and outputs 3 when 0 is received as an input in state $S_5$, shifts to state $S_7$ and outputs 1 when 0 is received as an input in state $S_6$, shifts to state $S_9$ and outputs 2 when 1 is received as an input in state $S_6$, shifts to state $S_0$ and outputs 0 when 0 is received as an input in state $S_7$, shifts to state $S_1$ and outputs 1 when 1 is received as an input in state $S_7$, shifts to state $S_6$ and outputs 3 when 0 is received as an input in state $S_8$, and shifts to state $S_2$ and outputs 3 when 1 is received as an input in state $S_9$.

23. The information recording and reproducing apparatus according to claim 16 wherein in the state transition diagram of internal states $S_0$~$S_9$, the state remains as state $S_0$ and outputs 0 from said waveform equalization means when input 0 to said recording and reproducing means is received as an input in state $S_0$, shifts to state $S_1$ and outputs 1 when 1 is received as an input in state $S_0$, shifts to state $S_2$ and outputs 3 when 1 is received as an input in state $S_1$, shifts to state $S_8$ and outputs 4 when 0 is received as an input in state $S_2$, shifts to state $S_3$ and outputs 5 when 1 is received as an input in state $S_2$, shifts to state $S_5$ and outputs 5 when 0 is received as an input in state $S_3$, shifts to state $S_4$ and outputs 6 when 1 is received as an input in state $S_3$, shifts to state $S_5$ and outputs 5 when 0 is received as an input in state $S_4$, remains as state $S_4$ and outputs 6 when 1 is received as an input in state $S_4$, shifts to state $S_6$ and outputs 3 when 0 is received as an input in state $S_5$, shifts to state $S_7$ and outputs 1 when 0 is received as an input in state $S_6$, shifts to state $S_9$ and outputs 2 when 1 is received as an input in state $S_6$, shifts to state $S_0$ and outputs 0 when 0 is received as an input in state $S_7$, shifts to state $S_1$ and outputs 1 when 1 is received as an input in state $S_7$, shifts to state $S_6$ and outputs 3 when 0 is received as an input in state $S_8$, and shifts to state $S_2$ and outputs 3 when 1 is received as an input in state $S_9$.

* * * * *